United States Patent

Masuichi et al.

[11] Patent Number: 5,905,980
[45] Date of Patent: May 18, 1999

[54] DOCUMENT PROCESSING APPARATUS, WORD EXTRACTING APPARATUS, WORD EXTRACTING METHOD AND STORAGE MEDIUM FOR STORING WORD EXTRACTING PROGRAM

[75] Inventors: Hiroshi Masuichi; Hiroshi Umemoto; Masakazu Tateno, all of Nakai-machi, Japan

[73] Assignee: Fuji Xerox Co., Ltd., Tokyo, Japan

[21] Appl. No.: 08/933,113

[22] Filed: Sep. 18, 1997

[30] Foreign Application Priority Data

Oct. 31, 1996 [JP] Japan ................................. 8-290789

[51] Int. Cl.$^6$ ........................................... G06F 17/30
[52] U.S. Cl. ................................. 707/1; 707/3; 707/5
[58] Field of Search ......................... 707/1, 2, 3, 4, 707/5, 6, 200

[56] References Cited

U.S. PATENT DOCUMENTS

| 5,265,065 | 11/1993 | Turtle | 395/600 |
|---|---|---|---|
| 5,418,948 | 5/1995 | Turtle | 395/600 |
| 5,488,725 | 1/1996 | Turtle et al. | 395/600 |
| 5,576,954 | 11/1996 | Driscoll | 395/603 |
| 5,694,559 | 12/1997 | Hobson et al. | 395/336 |
| 5,694,592 | 12/1997 | Driscoll | 395/603 |
| 5,737,734 | 4/1998 | Schultz | 707/5 |
| 5,749,081 | 5/1998 | Whiteis | 707/102 |

FOREIGN PATENT DOCUMENTS

A 2-297290  12/1990  Japan .

OTHER PUBLICATIONS

Kwok "A Network Approuch to Probabilistic Information Retrieval" ACM Transactions on Information Systems, vol. 13, No. 3, pp. 324–353, Jul. 1995.

Syu et al. "A Competition–Based Connectionist Model for Information Retrieval Using a Merged Thesaurus" CIKM, 94, pp. 164–170, Mar. 1994.

Verma et al. "Evaluation of Overflow Probabilities in Resource Management" IEEE Database, ICC 92, pp. 1212–1216, Aug. 1992.

Tseng et al. "A Probabilitistic A Approach to Query Processing in Heterogeneous Database Systems" IEEE Database, pp. 176–183, Jul. 1992.

(List continued on next page.)

Primary Examiner—Paul V. Kulik
Assistant Examiner—Michael J. Wallace, Jr.
Attorney, Agent, or Firm—Oliff & Berridge, PLC

[57] ABSTRACT

The present invention provides a document processing apparatus, word extracting apparatus, word extracting method and storage medium for storing a word extracting program, capable of appropriately presenting effective associate words to the user. A retrieving element executes retrieval of documents based on a retrieval condition inputted through a retrieval condition inputting element. A keyword designating element designates an arbitrary word among the words included in the retrieved documents as an associate-word-searching word and designates other words as candidates for an associate word. A simultaneous appearance probability calculating element calculates a simultaneous appearance probability of the associate-word-searching word and one of the candidates for the associate word in any of the retrieved documents. A first independent appearance probability calculating element obtains an independent appearance probability of the associate-word-searching word in each of all documents. A second independent appearance probability calculating element calculates an independent appearance probability of each of the candidates for the associate word in each of all documents. A calculating element calculates the sum or product of the independent appearance probability of the associate-word-searching word and the independent appearance probability of each of the candidates for the associate word. An associate word extracting element extracts a word according to the ratio of the simultaneous appearance probability to the sum or product calculated by the calculating element.

7 Claims, 31 Drawing Sheets

OTHER PUBLICATIONS

Haruno et al., "Bilingual Text Alignment Using Statistical and Dictionary Information," *Information Processing Society of Japan*, SIG Notes, 96–NL–112, pp. 23–30, 1996.

Ohmori et al., "Automated Formation of bilingual Dictionary Using Statistical Information," *Proceedings of the Second Annual Meeting of the Association for Natural Language Processing*, pp. 49–52, 1996.

FIG. 3

| Document Identifier | Extracted words |
|---|---|
| 1 | economy, business situation, trend, get, national economy calculation, show, index, ... |
| 2 | business situation, prosperity, depression, proceed, turning point, get, prepare, ... |
| 3 | business situation, determination, advance, main, enterprise, state, important, the Bank of Japan, ... |
| 4 | the United States of America, business situation, trend, watch, money supply, statistics, ... |
| 5 | economy, activity, support, production, movement, grasp, production index, ... |
| 6 | economy, stable growth, transfer, employment, state, grasp, change, statistics, ... |
| ... | ... |

FIG. 4

Word-Word Identifier List

| Word | Word identifier |
|---|---|
| the United States of America | 1 |
| money supply | 2 |
| get | 3 |
| watch | 4 |
| stable growth | 5 |
| transfer | 6 |
| movement | 7 |
| activity | 8 |
| enterprise | 9 |
| business situation | 10 |
| economy | 11 |
| prosperity | 12 |
| national economy calculation | 13 |
| employment | 14 |
| prepare | 15 |
| support | 16 |
| index | 17 |
| show | 18 |
| important | 19 |
| main | 20 |
| state | 21 |

Word Identifier-Document Identifier List

| Word identifier | Document Identifier |
|---|---|
| 1 | 4, ••• |
| 2 | 4, ••• |
| 3 | 1, 2, ••• |
| 4 | 4, ••• |
| 5 | 6, ••• |
| 6 | 6, ••• |
| 7 | 5, ••• |
| 8 | 5, ••• |
| 9 | 3, ••• |
| 10 | 1, 2, 3, 4, ••• |
| 11 | 1, 5, 6, ••• |
| 12 | 2, 6, ••• |
| 13 | 1, ••• |
| 14 | 6, ••• |
| 15 | 2, ••• |
| 16 | 5, ••• |
| 17 | 1, ••• |
| 18 | 1, ••• |
| 19 | 3, ••• |
| 20 | 3, ••• |
| 21 | 3, ••• |
| 22 | 3, ••• |

Document Identifier-Word Identifier List

| Document Identifier | Word Identifier |
|---|---|
| 1 | 3, 10, 11, 13, 17, 18, 26, ••• |
| 2 | 3, 10, 12, 15, 24, 30, 32, ••• |
| 3 | 9, 10, 19, 20, 21, 22, 27, 29, ••• |
| 4 | 1, 2, 4, 10, 25, 26, ••• |
| 5 | 7, 8, 11, 16, 23, 28, ••• |
| 6 | 5, 6, 11, 12, 14, 25, 28, 31, ••• |

Appearance Probability of Keyword

| Keyword | ID of a document in the set of documents D1, in which the keyword starts to appear | ID of a document in the set of documents D1, in which the keyword stops appearing | Appearance probability of the keyword in the set of documents D1 | ID of a document in the set of documents D2, in which the keyword starts to appear | ID of a document in the set of documents D2, in which the keyword stops appearing | Appearance probability of the keyword in the set of documents D2 |
|---|---|---|---|---|---|---|
| Word A | 0 | 50000 | 0.5 | 100000 | 150000 | 0.5 |
| Word B | 49000 | 99000 | 0.5 | 127000 | 177000 | 0.5 |
| Word C | 48000 | 98000 | 0.5 | 140000 | 190000 | 0.5 |
| Word D | 47000 | 97000 | 0.5 | 145000 | 195000 | 0.5 |
| Word E | 46000 | 96000 | 0.5 | 148000 | 198000 | 0.5 |

|  | Word B | Word C | Word D | Word E |
|---|---|---|---|---|
| Entire sets of document | 100.00 | 48.99 | 32.87 | 25.16 |
| Set of documents D1 | 24.88 | 47.38 | 74.93 | 100.00 |

Comparison of mutual information
(maximum value is assumed to be 100)

FIG. 31

| Set of documents for associate word calculation | Set of documents including "Israel" (72 documents) | Set of documents including "India" (138 documents) |
|---|---|---|
| Results of associate word calculation for the initial keyword "religion" (arranged in descending order of mutual information between each result and the keyword "religion") | the Old Testament<br>the Israelites<br>Likud<br>Vatican<br>synagogue<br>the Jewish race<br>Zionism<br>Hebrew<br>occupation area<br>Paul<br>Jericho<br>Jerusalem<br>pope<br>•<br>•<br>• | Buddha<br>religious meditation<br>law<br>engrossment<br>veda<br>blasphemy<br>sage<br>divine<br>the founder<br>yoga<br>Buddhistic emancipation<br>Hinduism<br>caste<br>•<br>•<br>• |

DOCUMENT PROCESSING APPARATUS, WORD EXTRACTING APPARATUS, WORD EXTRACTING METHOD AND STORAGE MEDIUM FOR STORING WORD EXTRACTING PROGRAM

BACKGROUND OF THE INVENTION

1. Field of the Invention

The present invention relates to a document processing apparatus for processing various types of documents, a word extracting apparatus for extracting a word from a text item including plural words, a word extracting method used in the document processing apparatus, and a storage medium for storing a word extracting program, and in particular relates to a document processing apparatus for calculating the degree of association between words, a word extracting apparatus for extracting a word in accordance with the degree of association between words, a word extracting method used in the document processing apparatus for calculating the degree of association between words, and a storage medium for storing a word extracting program for extracting a word in accordance with the degree of association between words.

2. Discussion of the Related Art

In a retrieval system which deals with an enormous amount of documents, a retrieval method using keywords is generally adopted. As an arbitrary keyword (retrieval word) is inputted to the retrieval system as a retrieval condition, all the documents including the keyword in their contents are obtained as a result of retrieval. The retrieval according to this method is called a full text search. Also, another method is widely used in which one or more keywords for retrieval are added to each document in advance and the document having the keywords one of which matches an inputted retrieval word is regarded as a result of retrieval.

However, no more than the documents including the word completely matching a retrieval word inputted by a user or the documents to which the word is added as the keyword and completely matches a keyword inputted by a user may be obtained by the above-described retrieval systems.

In such retrieval systems, accordingly, complete match between the retrieval word and the keyword is required and it is impossible to obtain all the documents pursued by the user. Therefore, as proposed by Japanese Patent Application Laid-Open No. 2-297290 (1990), a method is adopted, which presents associate words of the retrieval word to the user based on an associate word dictionary and recommends preparation of a retrieval expression closer to the purpose of retrieval for preventing oversight in retrieval.

For example, if the retrieval word inputted by a user is "SGML", the words "HTML", "ODA", "structured document" and so forth are acquired as the associate words of "SGML" from the associate word dictionary and offered to the user. The associate words determined to be appropriate by the user are connected with "SGML" by OR to execute retrieval, and thereby the possibility of oversight in retrieval is reduced.

A great deal of manpower is required for manual operation to prepare the associate word dictionary; consequently, a method has been suggested for automatically acquiring the associate words by calculation based on the contents of the document to be the object of retrieval. This is to acquire a word associating with another word by the statistical processing on the basis of frequency information of a word appearing in the retrieval object document.

For calculating the associate words, mutual information, Dice-coefficient and t-score are mainly used as statistical values. The mutual information (MI), Dice-coefficient (DC) and t-score (TS) between the words word1 and word2 are defined as follows.

$$MI(word1, word2) = \log_2\{prob(word1, word2)/[prob(word1)prob(word2)]\} \quad (1)$$

$$DC(word1, word2) = 2prob(word1, word2)/[prob(word1)+prob(word2)] \quad (2)$$

$$TS(word1, word2) = M[prob(word1, word2) - prob(word1)prob(word2)]/[prob(word1)prob(word2)] \quad (3)$$

In the case it is assumed that the number of all of the documents to be the object of retrieval is M, the number of documents including both word1 and word2 is a, the number of documents including only word1 is b and the number of documents including only word2 is c, prob(word1, word2), prob(word1) and prob(word2) are expressed as follows:

$$prob(word1, word2) = a/M \quad (4)$$

$$prob(word1) = (a+b)/M \quad (5)$$

$$prob(word2) = (a+c)/M \quad (6)$$

Any of MI(word1, word2), DC(word1, word2) and TS(word1, word2) means that the higher degree of association exists between word1 and word2 as their values become larger. For obtaining associate words by using these statistical values and preparing the associate word dictionary, the following art was disclosed by "Bilingual Text Alignment Using Statistical and Dictionary Information", Haruno and Yamazaki, Information Processing Society of Japan, SIG Notes, 96-NL-112, pp. 23–30, 1996, "Automated Formation of Bilingual Dictionary Using Statistical Information", Ohmori et al., Proceeding of the Second Annual Meeting of the Association for Natural Language Processing, pp. 49–52, 1996, and so forth.

At first, all words (independent words) included in the document to be the object of retrieval are extracted using technique such as morphological analysis as the first step. Simultaneously, a pointer to an identifier of a document including each of the extracted words is recorded. That is, a structure capable of designating a document including a word based on the word is generated.

Next, as the second step, the first process for word1 and word2 as follows is applied to all binary combinations of the words extracted in the first step.

The first process is described as follows.

The number of the documents including word1 (=a+b), the number of the documents including word2 (=a+c), and the number of the documents including both word1 and word2 (=a) are obtained and each of them is divided by the number of all documents (=M), thus prob(word1), prob(word2) and prob(word1, word2) are calculated. Based on these values, MI(word1, word2) (or DC(word1, word2) or TS(word1, word2))is obtained according to equation (1) (or equation (2) or (3)).

As the third step, the second process for word3 as follows is applied to all the words extracted in the first step to prepare the associate word dictionary.

The second process is described as follows:

The third process for word4 as follows is applied to all the words except word3 and the word obtained as the return value is recorded as an associate word of word3.

The third process is as follows:

If the value of MI(word3, word4) (or DC(word3, word4) or TS(word3, word4)) is larger than the predetermined threshold value T, word4 is the return value. If the value is smaller than T, it means that there is no return value.

By execution of the above processes, the associate words corresponding to all the words extracted in the first step are obtained and retained in the associate word dictionary. The associate words to be registered at the associate word dictionary are limited to those having a value such as mutual information Ml larger than the threshold value T, and therefore it may be considered that the words having relatively high degree of association are registered at the associate word dictionary.

In general, what type of lexicon the associate words of a specific word constitute greatly depend on the field to be the object of retrieval. For example, in the field of information processing, the associate words of "ODA" are "SGML", "HTML", "structured document" and so on, but in the field of economics/sociology, they are "official development assistance", "UNCTAD", "OOF" and so on. In the above-described conventional art, the contents of obtained associate word dictionary are appropriate to the field which is the object of retrieval because the calculation of associate words is executed based on the contents of the document to be the object of retrieval.

In an interactive document retrieval system, narrowing down the documents is conducted as the retrieving process proceeds, and as a result, detection of the desired document becomes easy.

However, in the conventional art, if the documents are narrowed down in the process of retrieval, there occurs a problem that the associate words generated based on the contents of all documents to be the objects of retrieval differ from those necessary for the user.

For example, even if the documents are narrowed down to the set of the field of economics/sociology based on the bibliographic items, in addition to the proper words, "SGML", "HTML", "structured document" and so on are obtained against user's will as the associate words of "ODA" according to the associate word dictionary prepared in conformance to the contents of all the documents.

Even in the case where the associate words are displayed in descending order of degree of association, keywords ranked at higher positions are not always close to the purpose of retrieval of the user if many keywords not reflecting the user's will are included in the associate words as described above. Accordingly, it is the burden for the user to select the proper keywords from the obtained associate words.

Since a person conducting retrieval has human feelings, he/she has a physical and mental limit called a futility point in the process of determination of appropriateness of the associate words. If the number of associate words presented to him/her exceeds the limit, it is impossible for him/her to select all words suitable for the purpose of retrieval.

As described so far, in the conventional interactive retrieval system, ratio of improper keywords to the obtained associate words increases by narrowing down the documents as the retrieving process proceeds. Besides, for making a presentation of the associate words so that the appropriate keywords are sufficiently included, it is necessary to increase the number of associate words to be presented, and accordingly there occurs a problem that the number of presented associate words immediately reaches the futility point as a result. In other words, it is practically impossible to utilize the presentation of the associate words.

SUMMARY OF THE INVENTION

The present invention has been made in view of the above circumstances and has an object to provide a document processing apparatus capable of appropriately presenting useful associate words to the user.

Another object of the present invention is to provide a word extracting apparatus capable of appropriately presenting useful associate words to the user.

Another object of the present invention is to provide a word extracting method for appropriately presenting useful associate words to the user.

Further object of the present invention is to provide a storage medium for storing a word extracting program capable of constructing a computer for appropriately presenting useful associate words to the user.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a document processing apparatus of the present invention comprises a document information storing element for storing information including a document identifier and a plurality of words included in a document for each of all documents, a retrieval condition inputting element for inputting a retrieval condition for the documents to be retrieved, a retrieving element for retrieving specific documents matching the retrieval condition by using the information, a keyword designating element for designating an arbitrary word in the documents as an associate-word-searching word and designating other words as candidates to be associated, a simultaneous appearance probability calculating element for calculating a probability that the associate-word-searching word and one of the candidates are simultaneously included in any of the documents retrieved by the retrieving element for each of the candidates, a first independent appearance probability calculating element for calculating a first probability that the associate-word-searching word is included in any of all documents, a second independent appearance probability element for calculating a second probability that one of the candidates is included in any of all documents for each of the candidates for the associate word, a calculating element for calculating the sum or product of the first and second probabilities for each of the candidates, and an associate word extracting element for calculating a ratio of the probability calculated by the simultaneous appearance probability calculating element to the sum or product calculated by the calculating element for each of the candidates and extracting a word according to the ratio of each of the candidates.

With this document processing apparatus, if a user inputs an arbitrary retrieval condition through the retrieval condition inputting element, the retrieving element retrieves documents matching the inputted retrieval condition using information stored in the document information storing element. Then the keyword designating element designates an arbitrary word among the words included in the retrieved documents as an associate-word-searching word, and designates other words as candidates for an associate word. The simultaneous appearance probability calculating element obtains the simultaneous appearance probability of the associate-word-searching word and one of the candidates for the associate word for each of the candidates. The first independent appearance probability calculating element calculates the first probability that the associate-wordsearching word is included in any of all documents. The second independent appearance probability calculating element calculates the second probability that one of the candidates for the associate word is included in any of all documents for each of the candidates. The calculating element calculates the product or sum of the first and second probabilities for each of the candidates for the associate word. The associate word extracting element obtains the ratio of the simultaneous appearance probability to the sum or product calculated by the calculating element, and extracts a word according to the ratio of each of the candidates for the associate word.

Thereby the user can determine the set of documents used for the associate word calculation at will and it becomes possible for the apparatus to make a presentation of associate words with more flexibility.

To resolve the above-described problem, the present invention also provides a word extracting apparatus which comprises an item information storing element for storing information including an item identifier and a plurality of words included in an item for each of all items, a retrieval condition inputting element for inputting a retrieval condition for the items to be retrieved, a retrieving element for retrieving specific items matching the retrieval condition by using the information, a keyword designating element for designating an arbitrary word in the items as an associate-word-searching word and designating other words as candidates to be associated, a simultaneous appearance probability calculating element for calculating a probability that the associate-word-searching word and one of the candidates are simultaneously included in any of the retrieved items for each of the candidates, a first independent appearance probability calculating element for calculating a first probability that the associate-word-searching word is included in any of all items, a second independent appearance probability calculating element for calculating a second probability that one of the candidates for the associate word is included in any of all items for each of the candidates, a calculating element for calculating the sum or product of the first and second probabilities for each of the candidates, and an associate word extracting element for calculating a ratio of the probability calculated by the simultaneous appearance probability calculating element to the sum or product calculated by the calculating element for each of the candidates and extracting a word according to the ratio of each of the candidates.

With this word extracting apparatus, if a user inputs an arbitrary retrieval condition through the retrieval condition inputting element, the retrieving element retrieves items matching the inputted retrieval condition by using the information stored in the item information storing element. Then the keyword designating element designates an arbitrary word among the words included in the items retrieved by the retrieving element as an associate-word-searching word and designates other words as candidates to be associated. The simultaneous appearance probability calculating element obtains the simultaneous appearance probability of the associate-word-searching word and one of the candidates for the associate word in any of the retrieved items. The first independent appearance probability calculating element calculates the first probability that the associate-word-searching word is included in any of all items. The second independent appearance probability calculating element calculates the second probability that one of the candidates for the associate word is included in any of all items for each of the candidates for the associate word. The calculating element calculates the sum or product of the first and second probabilities for each of the candidates for the associate word. Then the associate word extracting element calculates the ratio of the simultaneous appearance probability to the sum or product calculated by the calculating element for each of the candidates, and extracts a word according to the ratio of each of the candidates.

Thereby the user can determine the set of items used for the associate word calculation at will and it becomes possible for the apparatus to make a presentation of associate words with more flexibility.

To resolve the above-described problem, the present invention further provides a word extracting method used by an information retrieving apparatus having an item information storing element for storing information including an item identifier and a plurality of words included in an item for each of all items, comprising the steps of inputting a retrieval condition for the items, retrieving specific items matching the retrieval condition by using the information, designating an arbitrary word in the retrieved items as an associate-word-searching word and designating other words as candidates to be associated, calculating a simultaneous probability that the associate-word-searching word and one of the candidates are simultaneously included in any of the retrieved items for each of the candidates, calculating a first probability that the associate-word-searching word is included in any of all items, calculating a second probability that one of the candidates for the associate word is included in any of all items for each of the candidates, calculating the sum or product of the first and second probabilities for each of the candidates, and calculating a statistical value using the simultaneous appearance probability and the sum or product for each of the candidates and extracting a word according to the statistical value of each of the candidates.

With this word extracting method, if the retrieval condition is inputted, items matching the inputted retrieval condition are retrieved. Then an arbitrary word among the words included in the retrieved items is designated as an associate-word-searching word and other words are designated as candidates for the associate word and registered to the list of the candidates. The statistical value is calculated based on the simultaneous appearance probability and the sum or product of the first and second probabilities. Then a word is extracted according to the statistical value calculated for each of the candidates.

Thereby the user can determine the set of items used for the associate word calculation at will and it becomes possible for the method to make a presentation of associate words with more flexibility.

To resolve the above-described problem, the present invention further provides a storage medium readable by a computer, storing a program of instructions executable by the computer to perform a method for extracting a word, the method comprising the steps of storing information including an item identifier and a plurality of words included in an item for each of all items, inputting a retrieval condition for the items, retrieving specific items matching the retrieval condition by using the information, designating an arbitrary word in the retrieved items as an associate-word-searching word and designating other words as candidates to be associated, calculating a simultaneous probability that the associate-word-searching word and one of the candidates are simultaneously included in any of the retrieved items for each of the candidates, calculating a first probability that the associate-word-searching word is included in any of all items, calculating a second probability that one of the candidates for the associate word is included in any of all items for each of the candidates, calculating the sum or product of the first and second probabilities for each of the candidates, and calculating a statistical value using the simultaneous appearance probability and the sum or product for each of the candidates and extracting a word according to the statistical value of each of the candidates.

By having the computer execute the word extracting program stored in the storage medium, a computer system is constructed which has a function for storing information including an item identifier and a plurality of words included in an item for each of all items, a function for inputting a retrieval condition for the items, a function for retrieving specific items matching the retrieval condition by using the information, a function for designating an arbitrary word in the retrieved items as an associate-word-searching word and designating other words as candidates to be associated, a function for calculating a simultaneous probability that the associate-word-searching word and one of the candidates are simultaneously included in any of the retrieved items for each of the candidates, a function for calculating a first probability that the associate-word-searching word is included in any of all items, a function for calculating a second probability that one of the candidates for the associate word is included in any of all items for each of the candidates, calculating the sum or product of the first and second probabilities for each of the candidates, and a function for calculating a statistical value using the simultaneous appearance probability and the sum or product for each of the candidates and extracting a word according to the statistical value of each of the candidates.

BRIEF DESCRIPTION OF THE DRAWINGS

The accompanying drawings, which are incorporated in and constitute a part of this specification illustrate embodiments of the invention and, together with the description, serve to explain objects, advantages and principles of the invention. In the drawings:

FIG. 3 shows an example of a list of results of morphological analysis;

FIG. 4 shows an example of a list of word-word identifier;

FIG. 5 shows an example of a list of word identifier-document identifier;

FIG. 6 shows an example of a list of document identifier-word identifier;

FIG. 29 shows an example of data for simulation to confirm an effect of the present invention;

FIG. 31 shows an example of a result of calculation of the present invention using real data.

DETAILED DESCRIPTION OF THE PREFERRED EMBODIMENTS

Figure 1:
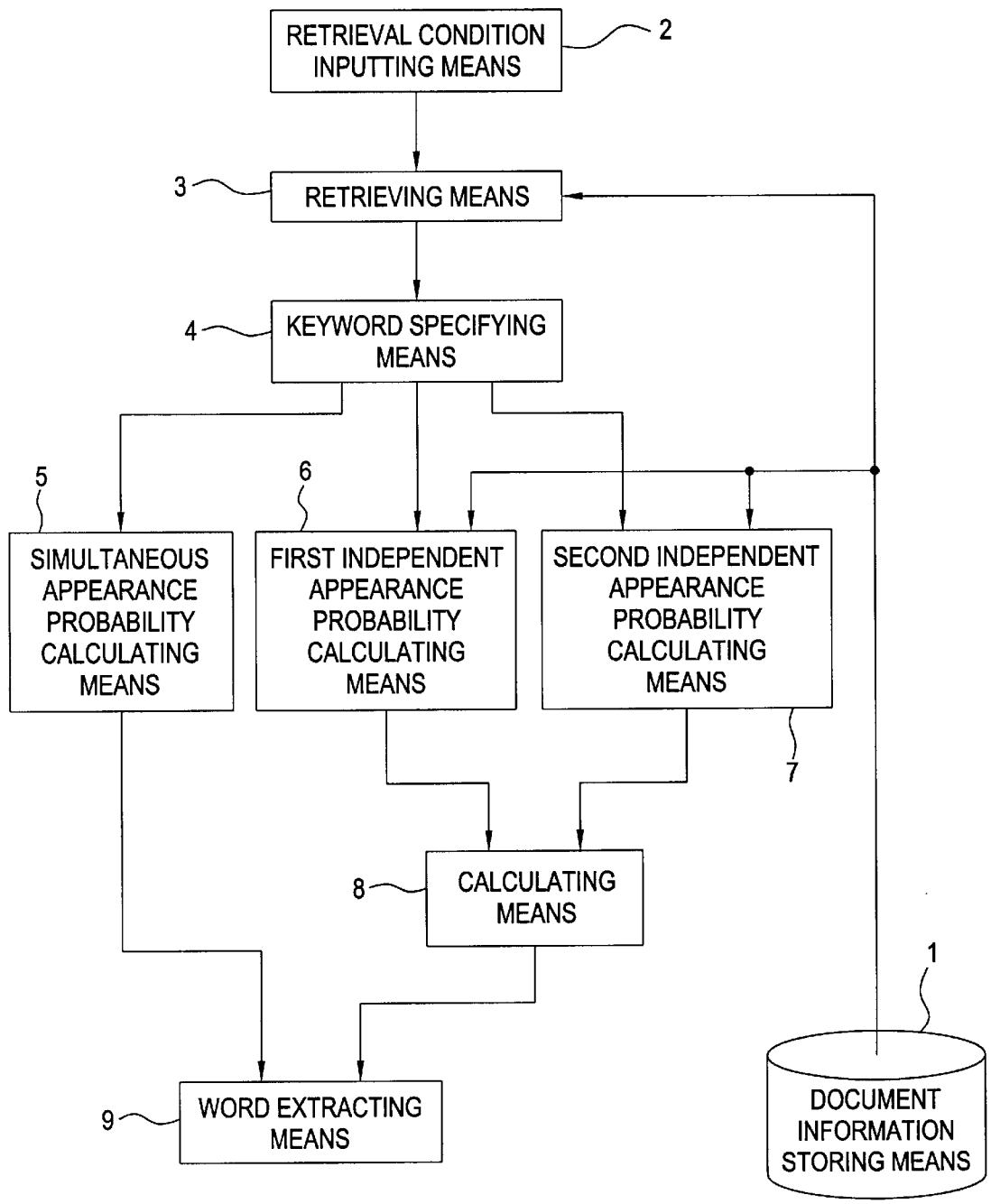
FIG. 1 shows a fundamental construction of the present invention.

FIG. 1 shows a fundamental construction of the present invention.

A document information storing means 1 stores information including plural sets of a document identifier for identifying a document and words included in the document for each of all documents.

A retrieval condition inputting means 2 is used for inputting a retrieval condition. The inputted retrieval condition is transferred to the retrieving means 3. The retrieving means 3 retrieves the documents matching the retrieval condition inputted through the retrieval condition inputting means 2 by using the information stored in the document information storing means 1. A keyword designating means 4 designates an arbitrary word among the words included in the documents retrieved by the retrieving means 3 as an associate-word-searching word and designates other words as candidates for an associate word.

A simultaneous appearance probability calculating means 5 obtains a simultaneous appearance probability which is a provability that the associate-word-searching word and one of the candidates for the associate words are included in any of the documents retrieved by the retrieving means 3 for each of the candidates.

A first independent appearance probability calculating means 6 obtains a probability that the associate-word-searching word is included in any of all documents. In the same way, a second independent appearance probability calculating means 7 obtains a probability that one of the candidates for the associate word is included in any of all documents for each of the candidates.

A calculating means 8 calculates the sum or product of the probabilities obtained by the first independent appearance probability calculating means 6 and second independent appearance probability calculating means 7. A word extracting means 9 extracts a word in accordance with the ratio of the simultaneous appearance probability obtained by the simultaneous appearance probability calculating means 5 to the sum or product calculated by the calculating means 8.

According to the document processing apparatus, if a user inputs the retrieval condition through the retrieval condition inputting means 2, documents matching the retrieval condition are retrieved by the retrieving means 3. Then the keyword designating means 4 designates an associate-word-searching word and designates other words as candidates for the associate word. Further, the simultaneous appearance probability calculating means 5 calculates the simultaneous appearance probability of the associate-word-searching word and one of the candidates based on the document retrieved by the retrieving means 3. The first independent appearance probability calculating means 6 and the second independent appearance probability calculating means 7 calculate the independent appearance probabilities of the associate-word-searching word and one of the candidates for the associate word, respectively. The sum or product of these appearance probabilities is calculated by the calculating means 8. Then the word extracting means 9 extracts an associate word of a specific word using the simultaneous appearance probability and the sum or product calculated by the calculating means 8.

Consequently, it becomes possible to arbitrarily narrow down the documents to be the basis of determination of the associate words. That is, if the retrieval condition for searching for associate words can be determined independently of narrowing down the documents in the course of the document retrieving process as in the present invention, it becomes possible to determine the set of the documents used for calculation of associate words at will, and thereby more flexible presentation of the associate words is available.

For example, it is assumed that a user's purpose of retrieval is "to know about accidents happened to baseball players caused by lumbago this year". Then the user obtains the "newspaper articles related to baseball of this year" from the bibliographic items at first, and executes retrieval based on the keyword "lumbago". If the associate words of the "lumbago" are to be obtained for preventing oversight in retrieval, the user designates "documents related to medical science" as the object of retrieval using the retrieval condition inputting means 2. The associate word calculation is executed using the "documents related to medical science", and thereby appropriate associate words such as "strained back", "hernia of an intervertebral disk", and so on are extracted by the word extracting means 8.

If the associate word calculation is executed using an ordinary thesaurus, "stomachache", "headache", "pain" and so forth are extracted as the associate words for "lumbago". In the case of associate word calculation for "lumbago" based on the "newspaper articles related to baseball of this year", the words "retirement", "absence from game" and so on are extracted. Accordingly, it is difficult to say either of the cases can provide appropriate associate words.

Preferred embodiments of the present invention are now described in detail based on the drawings.

First Embodiment

Figure 2:
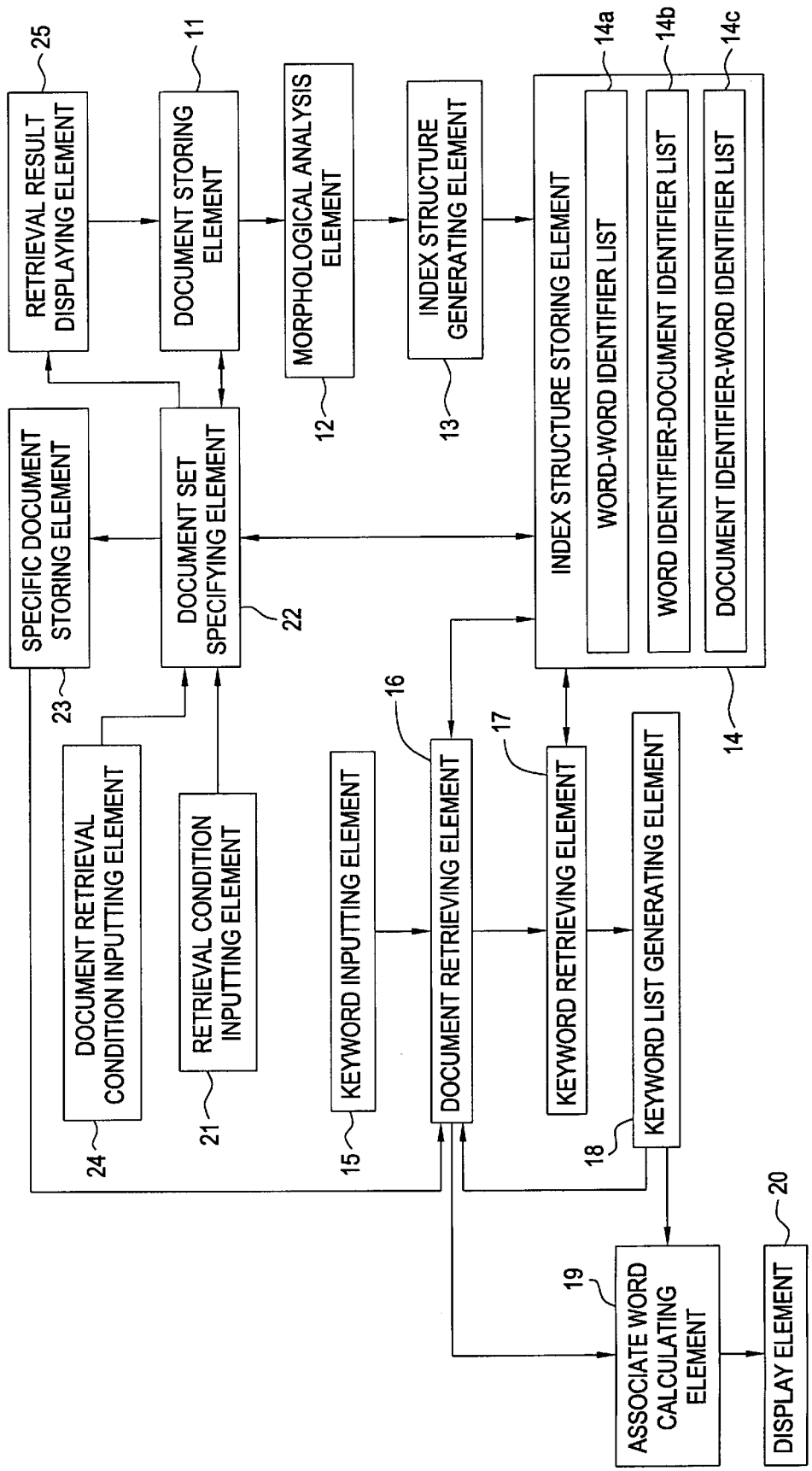
FIG. 2 shows a construction of the first embodiment of the present invention.

FIG. 2 illustrates a construction of the first embodiment of the present invention. Every constitutional element in FIG. 2 is described as follows.

A document storing element 11 makes sets of contents of electronic documents to be the object of retrieval, bibliographic items and document identifiers added by a morphological analysis element 12 and stores them.

The morphological analysis element 12 adds a document identifier to each of the documents stored in the document storing element 11, executes the morphological analysis on each document for extracting independent words, makes a pair of each extracted independent word with the corresponding document identifier, and inputs the pair to an index structure generating element 13.

The index structure generating element 13 is a program module for generating a word-word identifier list 14a, a word identifier-document identifier list 14b and a document identifier-word identifier list 14c as index structures based on the result of morphological analysis executed by the morphological analysis element 12. The word-word identifier list 14a describes relation of correspondence between a character string constituting a word and the word identifier indicating the corresponding word. The word identifier-document identifier list 14b describes sets of document identifiers of the documents including the character string of the word indicated by each of the word identifiers. The document identifier-word identifier list 14c describes sets of the word identifiers of the words included in each document indicated by each of the document identifiers.

An index structure storing element 14 is a storage device for storing the word-word identifier list 14a, the word identifier-document identifier list 14b and the document identifier-word identifier list 14c.

A keyword inputting element 15 is a program module having a user interface capable of inputting a keyword as an initial condition for obtaining associate words.

A document retrieving element 16 is a program module which receives the keyword and obtains the document identifiers of all documents including the keyword with reference to the word-word identifier list 14a and the word identifier-document identifier list 14b. If the received keyword is one of those described in a keyword list generated by a keyword list generating element 18 (described later), the document retrieving element 16 obtains only the total number of the document identifiers. On the other hand, in the case where the keyword is inputted through the keyword inputting element 15, the document retrieving element 16 acquires a set of document identifiers from among those obtained, which correspond to the documents stored in a specific document storing element 23 (described later), as well as the total number of the document identifiers.

A keyword retrieving element 17 is a program module for obtaining a set of identifiers of the words included in each of the documents of the set of documents indicated by the set of document identifiers obtained by the document retrieving element 16 with reference to the document identifier-word identifier list 14c, and for making a set of word identifiers by linking the obtained sets of word identifiers.

The keyword list generating element 18 is a program module for counting the number of times of appearance of each word identifier in the set of word identifiers obtained by the keyword retrieving element 17, and for generating a list of pairs of the word identifier and the number of times of appearance.

An associate word calculating element 19 is a program module for calculating the mutual information between the word corresponding to each word identifier in the list generated by the keyword list generating element 18 and the keyword inputted through the keyword inputting element 15 based on the list generated by the keyword list generating element 18 and the total number of the document identifiers obtained by the document retrieving element 16.

A displaying element 20 is a program module having a user interface for receiving the values of mutual information calculated by the associate word calculating element 19 and for outputting the words in descending order of values of the mutual information between each of those words and the keyword inputted through the keyword inputting element 15.

A retrieval condition inputting element 21 is a program module having a user interface through which a user can input a retrieval condition for obtaining a set of documents to be used for associate word calculation.

A document set designating element 22 is a program module for obtaining a set of document identifiers matching the retrieval word or condition represented by the logical expression inputted through the retrieval condition inputting element 21 or a document retrieval condition inputting element 24 (described later) with reference to the document storing element 11, word-word identifier list 14a and word identifier-document identifier list 14b.

The specific document storing element 23 stores a set of document identifiers obtained by the document set designating element 22 in accordance with the retrieval condition inputted through the retrieval condition inputting element 21.

The document retrieval condition inputting element 24 is a program module having a user interface through which the user can input the retrieval condition for execution of document retrieval.

A retrieval result displaying element 25 is a program module having a user interface capable of displaying document information corresponding to the set of document identifiers obtained by the document set designating element 22 based on the retrieval condition inputted through the document retrieval condition inputting element 24.

The above-described construction shown in FIG. 2 embodies the fundamental construction of the present invention shown in FIG. 1. The relation between the constituents of these constructions are as follows.

The document information storing element 11 and the index structure storing element 14 correspond to the document information storing means 1. The retrieval condition inputting element 21 corresponds to the retrieval condition inputting means 2. The document set designating element 22 and the specific document storing element 23 correspond to the retrieving means 3. The keyword inputting element 15, document retrieving element 16, keyword retrieving element 17 and keyword list generating element 18 correspond to the keyword designating means 4. The associate word calculating element 19 corresponds to the simultaneous appearance probability calculating means 5, the first independent appearance probability calculating means 6, the second independent appearance probability calculating means 7, calculating means 8 and word extracting means 9.

The document retrieval condition inputting element 24 and the retrieval result displaying element 25 are elements for executing the document retrieval, which are not indispensable to the construction of the present invention. However, the associate word presentation system is closely related to the document retrieval system; accordingly, the description of this embodiment will include the document retrieval system to show the close relationship.

In this embodiment, it is necessary to generate the index structure before the associate word calculation is executed. Therefore the index structure generating process is now explained.

As a premise of the index structure generating process, a list of the result of morphological analysis must have been provided. FIG. 3 exemplifies the list of the result of morphological analysis generated by the morphological analysis element 12. An identifier (document identifier) is assigned to each of the documents which are the objects of retrieval stored in the document storing element 11 and then the morphological analysis process is executed on each document to extract the independent words. Each of the extracted words is paired with the corresponding document identifier and stored in the list of the result of morphological analysis 31. In the case where the same independent word is extracted from a single document plural times, the second and subsequent extraction results are ignored, whereby there is no redundancy of independent word corresponding to a single document identifier.

Based on the list of the result of morphological analysis, the index structure generating element 13 generates several types of index structures. FIGS. 4–6 show examples of the index structures generated by the index structure generating element 13 and stored in the index structure storing element 14. It is assumed that the data shown in FIGS. 4–6 are generated based on the data shown in FIG. 3.

FIG. 4 shows an example of the word-word identifier list 32 in which the extracted words and identifiers assigned to the respective words are paired and stored.

FIG. 5 shows an example of the word identifier-document identifier list 33 in which each of the word identifiers is paired with the identifier of the document including the word indicated by the word identifier and stored.

FIG. 6 shows an example of the document identifier-word identifier list 34 in which each of the document identifiers is paired with the identifier of the word included in the document indicated by the document identifier and stored.

Figure 7:
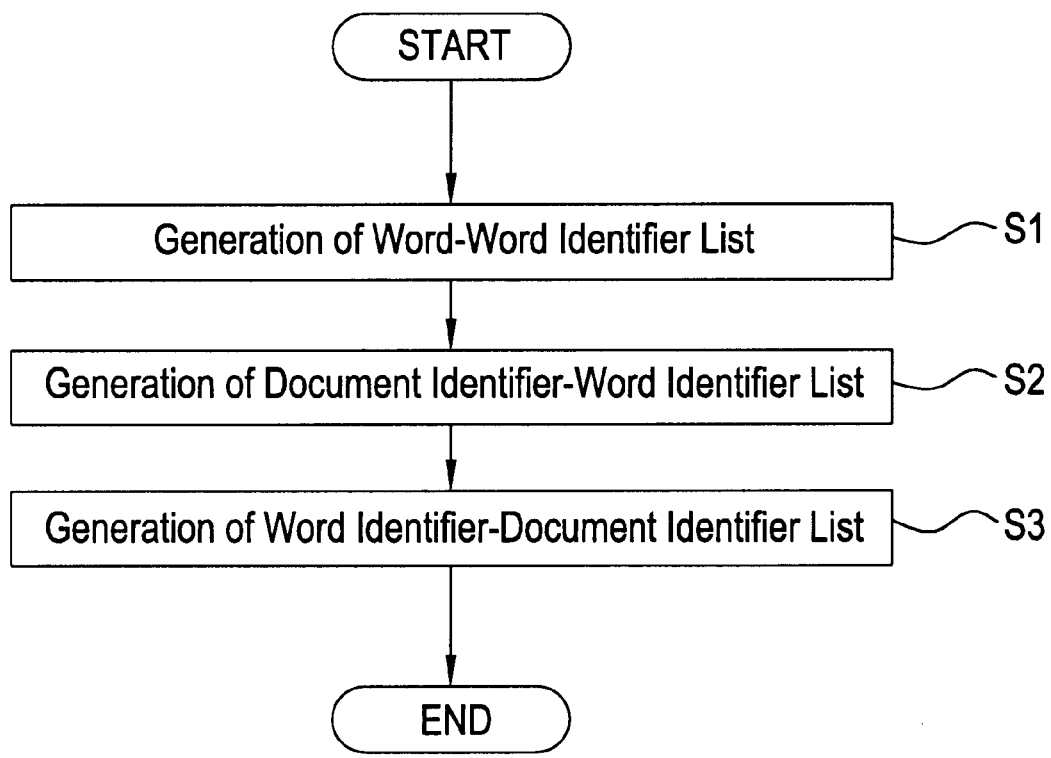
FIG. 7 is a flow chart showing procedures of generation of an index structure.

The algorithm for generating the index structure by the index structure generating element 13 is as follows. FIG. 7 is a flow chart showing the procedures in generating the index structure.

Step 1

The word-word identifier list 14a is generated. Specifically, a list of all words in the list of the result of morphological analysis stored in the morphological analysis element 12 is generated, in which the words are sorted and arranged in descending order of values of text codes of character strings of the words without redundancy, and the natural numbers starting from 1 are assigned as the word identifiers to the words from the top of the list.

Step 2

The document identifier-word identifier list 14c is generated. Specifically, each of the words in the list of the result of morphological analysis stored in the morphological analysis element 12 is replaced with the word identifier assigned in step 1, and corresponding word identifiers are sorted in the ascending order of their values for each document identifier.

Step 3

The word identifier-document identifier list 14b is generated. Specifically, the word identifiers are arranged in the ascending order starting from 1. The document identifiers of the documents in which the word corresponding to each word identifier is included are extracted with reference to the document identifier-word identifier list 14c generated in step 2. Each of the word identifiers is paired with the corresponding extracted document identifier and stored.

In this way the index structures are generated and stored in the index structure storing element 14. With this state it is possible to execute the associate word calculation.

Figure 8:
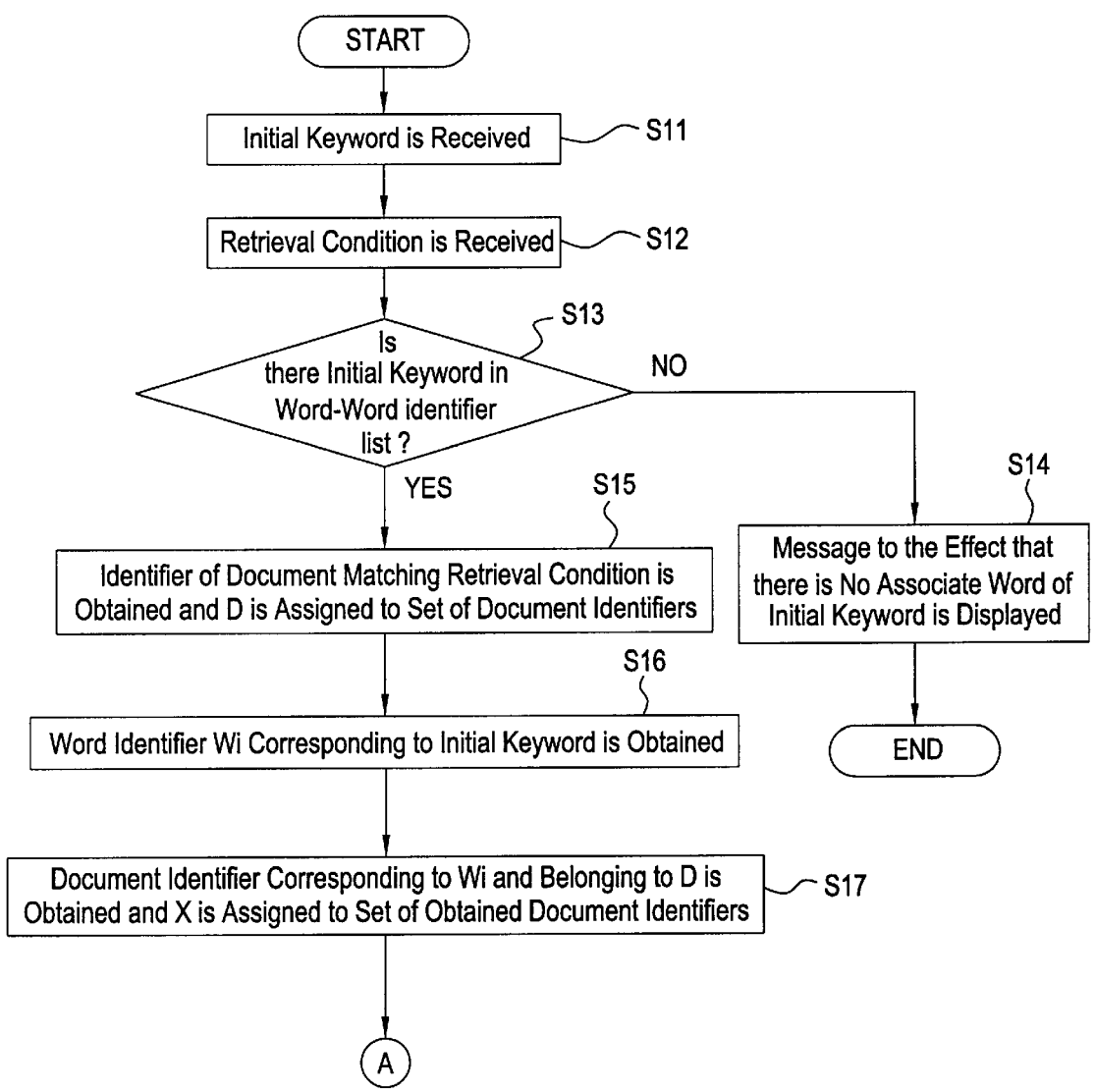
FIGS. 8 and 9 are flow charts showing procedures in the processes of the present invention.
Figure 9:
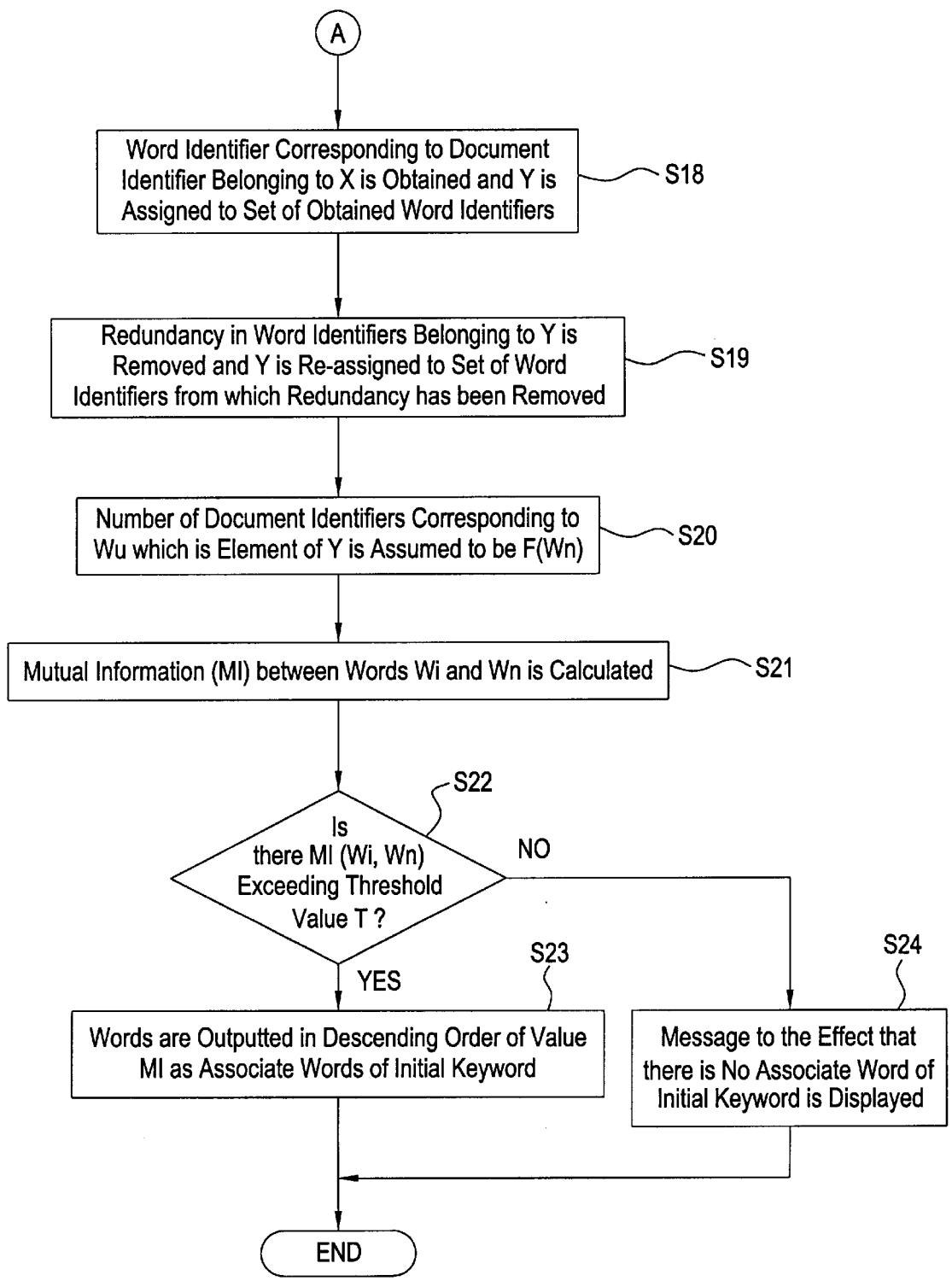

FIGS. 8 and 9 are flow charts showing procedures in processes of the present invention, which indicate an algorithm for obtaining associate words of a keyword inputted through the keyword inputting element 15 based on the document matching the retrieval condition inputted through the retrieval condition inputting element 21. The procedures are described with reference to the flow charts.

Step 11

The keyword inputting element 15 receives an initial keyword which is inputted by the user by means of keyboard or mouse operation. The initial keyword is transferred to the document retrieving element 16.

Step 12

The retrieval condition inputting element 21 receives a retrieval condition which is inputted by the user by means of keyboard or mouse operation. The retrieval condition is then transferred to the document set designating element 22.

Step 13

Receiving the initial keyword, the document retrieving element 16 determines whether the initial keyword is included in the word-word identifier list 14a or not. If it is included, the process proceeds to step 14, and if it is not included, the process proceeds to step 15.

Step 14

Since the initial keyword is not included in the word-word identifier list 14a, it is impossible to execute the associate word calculation. Therefore, the displaying element 20 displays a message to the effect that there is no associate word of the initial keyword, and the process is completed.

Step 15

Receiving the retrieval condition, the document set designating element 22 obtains the document identifiers of the documents matching the retrieval condition from the document storing element 11, the word-word identifier list 14a and the word identifier-document identifier list 14b, and a reference alphabet D is assigned to the obtained set of document identifiers. The set of document identifiers D is stored in the specific document storing element 23.

Step 16

The document retrieving element 16 obtains a word identifier Wi corresponding to the initial keyword.

Step 17

The document retrieving element 16 obtains the document identifiers corresponding to Wi and belonging to D from the word identifier-document identifier list 14b, and a reference alphabet X is assigned to the obtained set of document identifiers. The set of document identifiers X is transferred to the keyword retrieving element 17. The total number of document identifiers corresponding to Wi is assumed to be N. The total number of document identifiers N is transferred to the associate word calculating element 19. Then the process proceeds to step 18 in FIG. 9.

Step 18

The keyword retrieving element 17 obtains word identifiers corresponding to each of the document identifiers belonging to X from the document identifier-word identifier list 14c, and a reference alphabet Y is assigned to the obtained set of word identifiers. The set of the word identifiers Y is transferred to the keyword list generating element 18.

Step 19

The keyword list generating element 18 removes redundancy in word identifiers belonging to Y and records the number of times of repetition of each word identifier. The reference alphabet Y is reassigned to the set of word identifiers from which the redundancy has been removed. It is assumed that each of the word identifiers belonging to Y is Wn (n=1, 2, ... ,P) and the number of times of repetition of Wn is R (Wn). Here, P is the number of elements belonging to Y. The number of times of repetition R (Wn) is transferred to the associate word calculating element 19.

Step 20

The document retrieving element 16 obtains the total number of the document identifiers corresponding to all word identifiers belonging to Y, namely, Wn (n=1, 2, ... ,P) from the word identifier-document identifier list 14b. The number of document identifiers corresponding to Wn is assumed to be F (Wn). The number of document identifiers F (Wn) is transferred to the associate word calculating element 19.

Step 21

Provided that the number of all documents which are objects of retrieval is M, the associate word calculating element 19 calculates the mutual information (MI) between the initial keyword indicated by Wi and the word indicated by Wn, (MI (Wi, Wn)) as to Wn (n=1, 2, ... ,P) according to the equation (1) taking the following equations into consideration.

$$\text{prob}(Wi, Wn) = R(Wn)/M \quad (7)$$

$$\text{prob}(Wn) = F(Wn)/M \quad (8)$$

$$\text{prob}(Wi) = N/M \quad (9)$$

Step 22

The associate word calculating element 19 determines whether there is MI (Wi, Wn) (n=1, 2, ... ,P) exceeding the threshold value T or not. If there is any such MI (Wi, Wn), the process proceeds to step 23 and if there is no such MI (Wi, Wn), the process proceeds to step 24.

Step 23

The displaying element 20 obtains Wn corresponding to MI (Wi, Wn) (n=1, 2, ... ,P) exceeding the threshold value T in the descending order of the value of MI (Wi, Wn), and outputs the words corresponding to the obtained Wn as the associate words of the initial keyword with reference to the word-word identifier list 14a, thus the process is completed.

Step 24

The displaying element 20 displays a message to the effect that there is no associate word of the initial keyword and the process is completed.

As described above, in step 21 in the figure, it is possible to calculate the associate words suitable to the contents of the documents corresponding to the set of the document identifiers D by obtaining prob (Wi, Wn) based on the frequency of simultaneous appearance of Wi and Wn in the set of the documents D, each of the documents matches the retrieval condition inputted through the retrieval condition inputting element 21.

FIGS. 10 through 19 show the user interface of the first embodiment.

Figure 10:
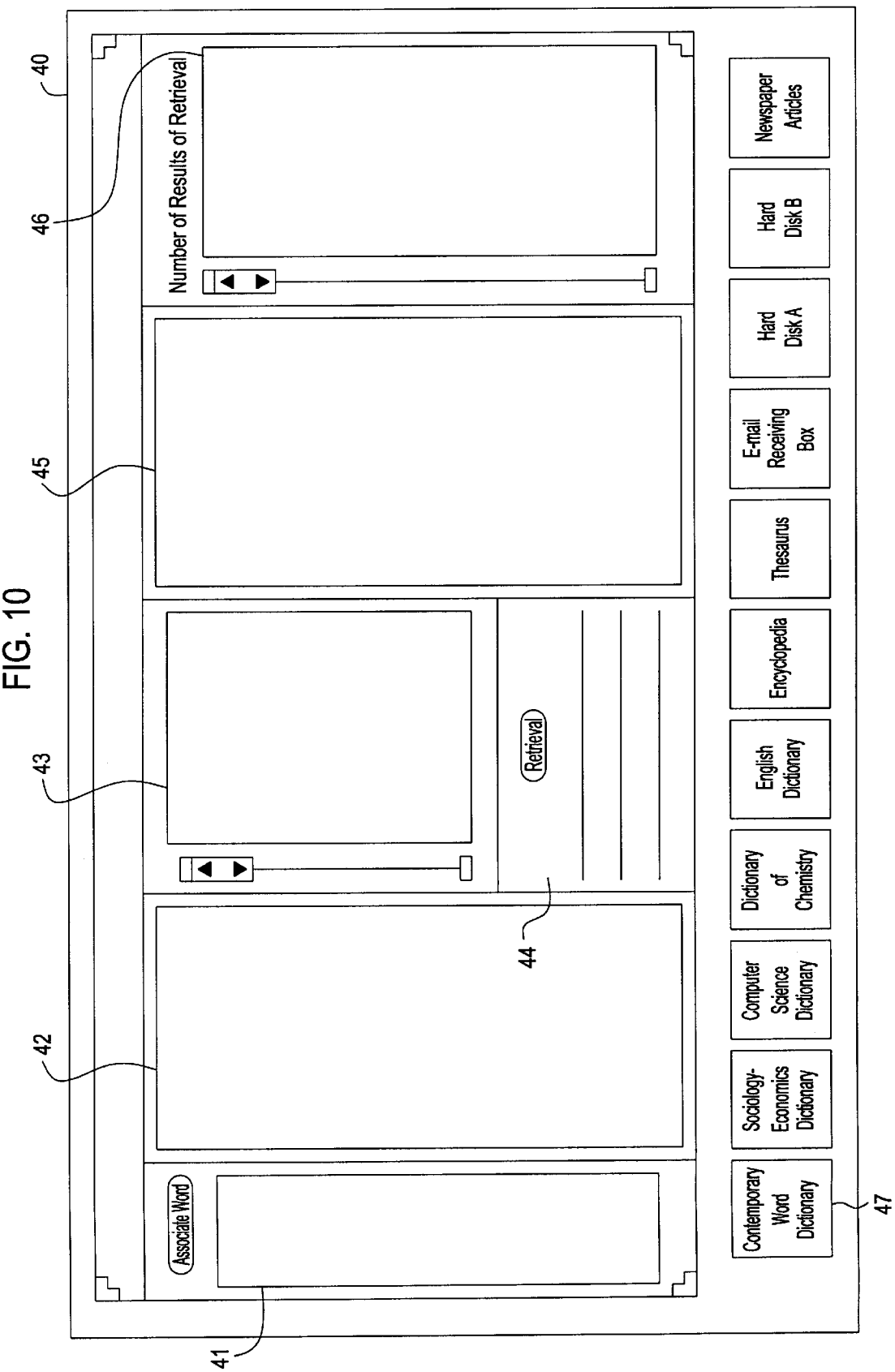
FIG. 10 shows an initial screen of a user interface of the first embodiment.

FIG. 10 shows an initial screen of the user interface of the first embodiment. In FIG. 10, plural subwindows 41 through 46 are displayed in a main window 40. The subwindows 41, 42, 43, 44, 45 and 46 correspond to the keyword inputting element 15, the retrieval condition inputting element 21, the displaying element 20, the document retrieval condition inputting element 24 and the retrieval result displaying element 25, respectively. In the subwindow 44, keywords punctuated with commas are connected by ORs in the same line, and the sets of the keywords connected by ORs, each of the sets corresponds to each line are connected by AND, and then the retrieval is executed.

Icons 47 arranged at the bottom of the main window 40 are visualized retrieval conditions for being inputted through the retrieval condition inputting element 21 or the document retrieval condition inputting element 24. For example, "sociology-economics dictionary icon" corresponds to retrieval conditions used for retrieval of the set of documents to which a bibliographic item indicating that the set of documents is an item included in the sociology-economics dictionary is assigned. To put any of these icons in the subwindows 42 and/or 45 means to designate the retrieval conditions.

FIGS. 11 through 19 show an example in the case where the purpose of retrieval is "to retrieve newspaper articles dealing with security issues of the United States Navy".

Figure 11:
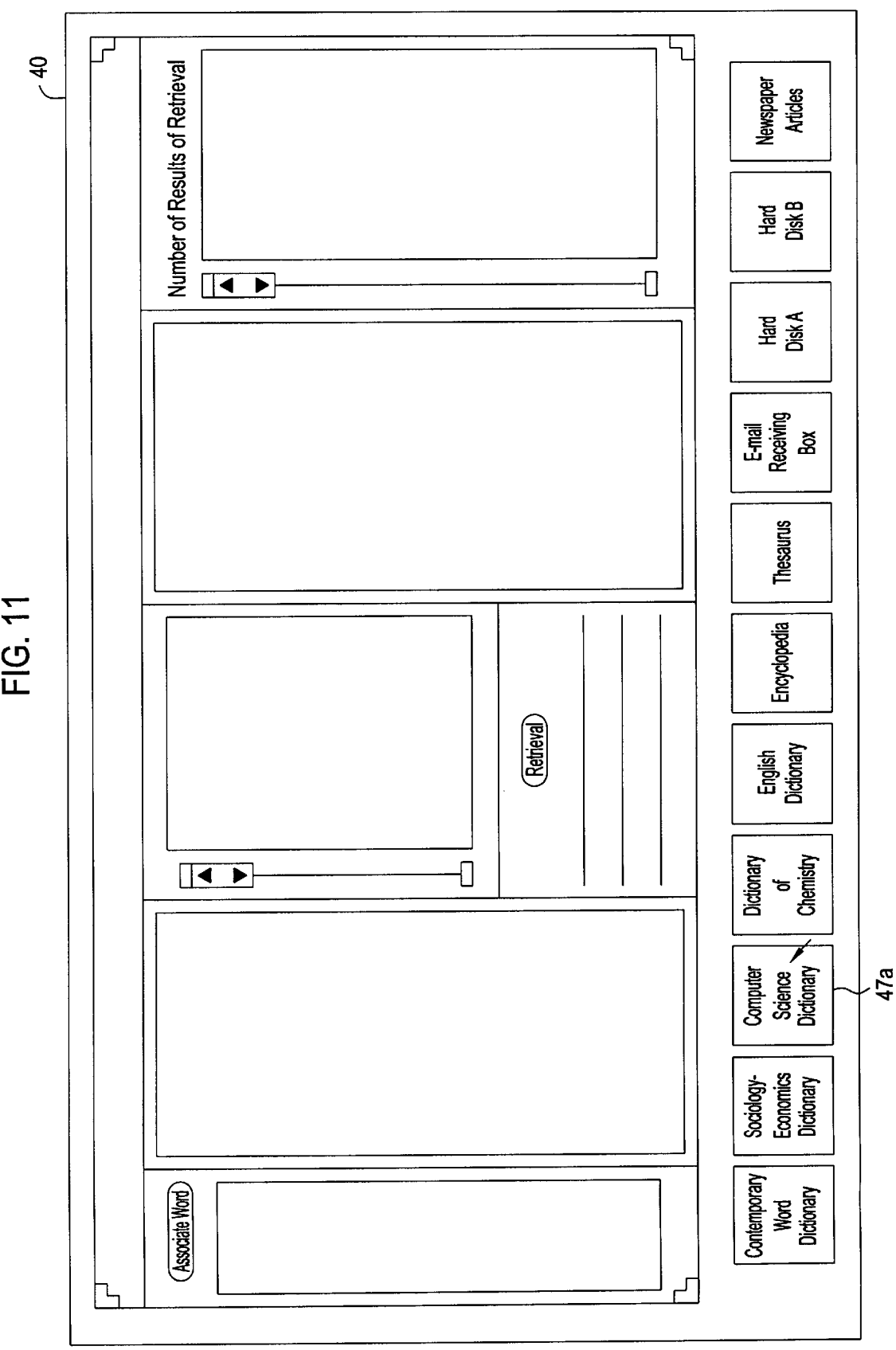
FIG. 11 shows the first operation screen of the user interface of the first embodiment.

At first, the retrieval condition is inputted. FIG. 11 shows the first operation screen of the user interface of the first embodiment. In the screen, the "computer science dictionary" icon 47a is selected as the set of documents used for associate word retrieval for obtaining associate words related to "security".

Figure 12:
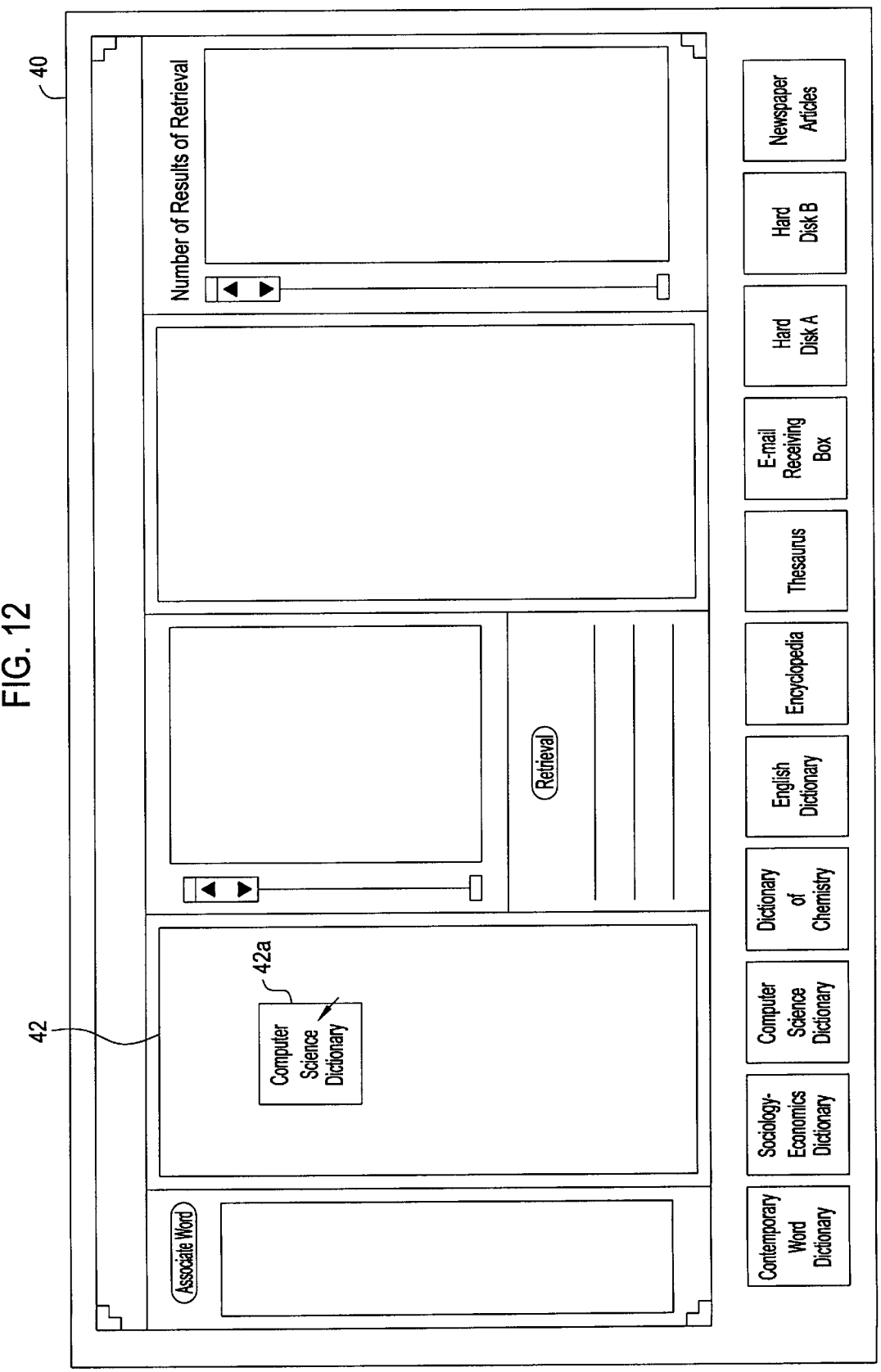
FIG. 12 shows the second operation screen of the user interface of the first embodiment.

The objective icon 47a is selected and copied to the subwindow 42. Fig. 12 shows the second operation screen of the user interface of the first embodiment. The selected icon "computer science dictionary" 47a is placed in the subwindow 42. Thereby "a retrieval condition for obtaining sets of documents to which the bibliographic items indicating that the sets of documents are items included in the computer science dictionary are assigned" are inputted through the retrieval condition inputting element 21.

Figure 13:
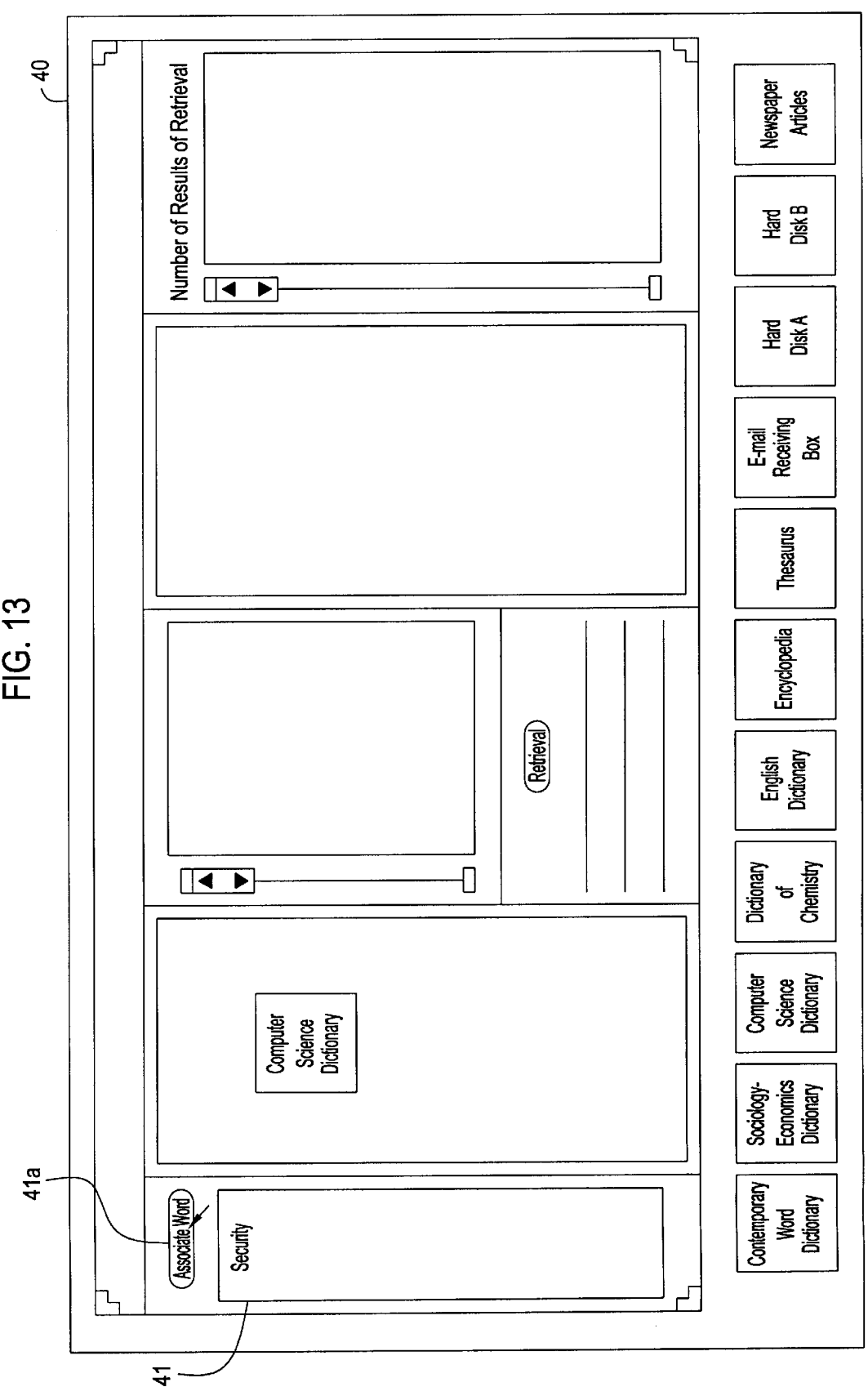
FIG. 13 shows the third operation screen of the user interface of the first embodiment.

As the input of the retrieval condition is completed, the initial keyword is inputted. FIG. 13 shows the third operation screen of the user interface of the first embodiment. In the screen, the initial keyword "security" for obtaining the associate word is inputted to the subwindow 41 and then an "associate word" button 41a is pressed. Here, "press" means that a mouse pointer is moved to the "associate word" button 41a and the button of the mouse is clicked on it.

Figure 14:
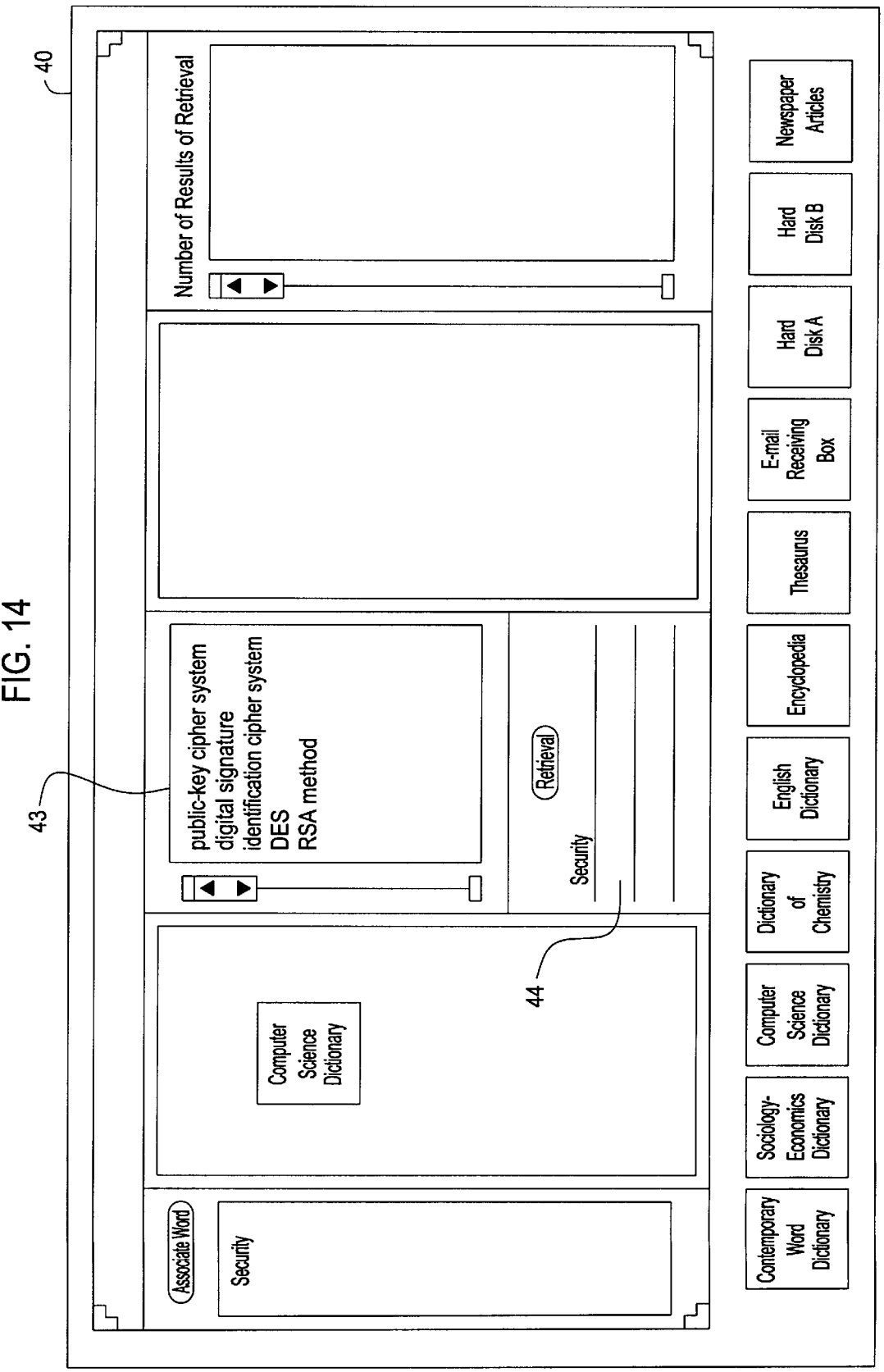
FIG. 14 shows the fourth operation screen of the user interface of the first embodiment.

After the "associate word" button 41a is pressed, processes shown in FIGS. 8 and 9 are executed. FIG. 14 shows the fourth operation screen of the user interface of the first embodiment. The associate words of "security" calculated based on the computer science dictionary are displayed in the subwindow 43 as a result of the processes shown in FIGS. 8 and 9. At this time, "security" which has been inputted to the subwindow 41 is also inputted to the subwindow 44.

Figure 15:
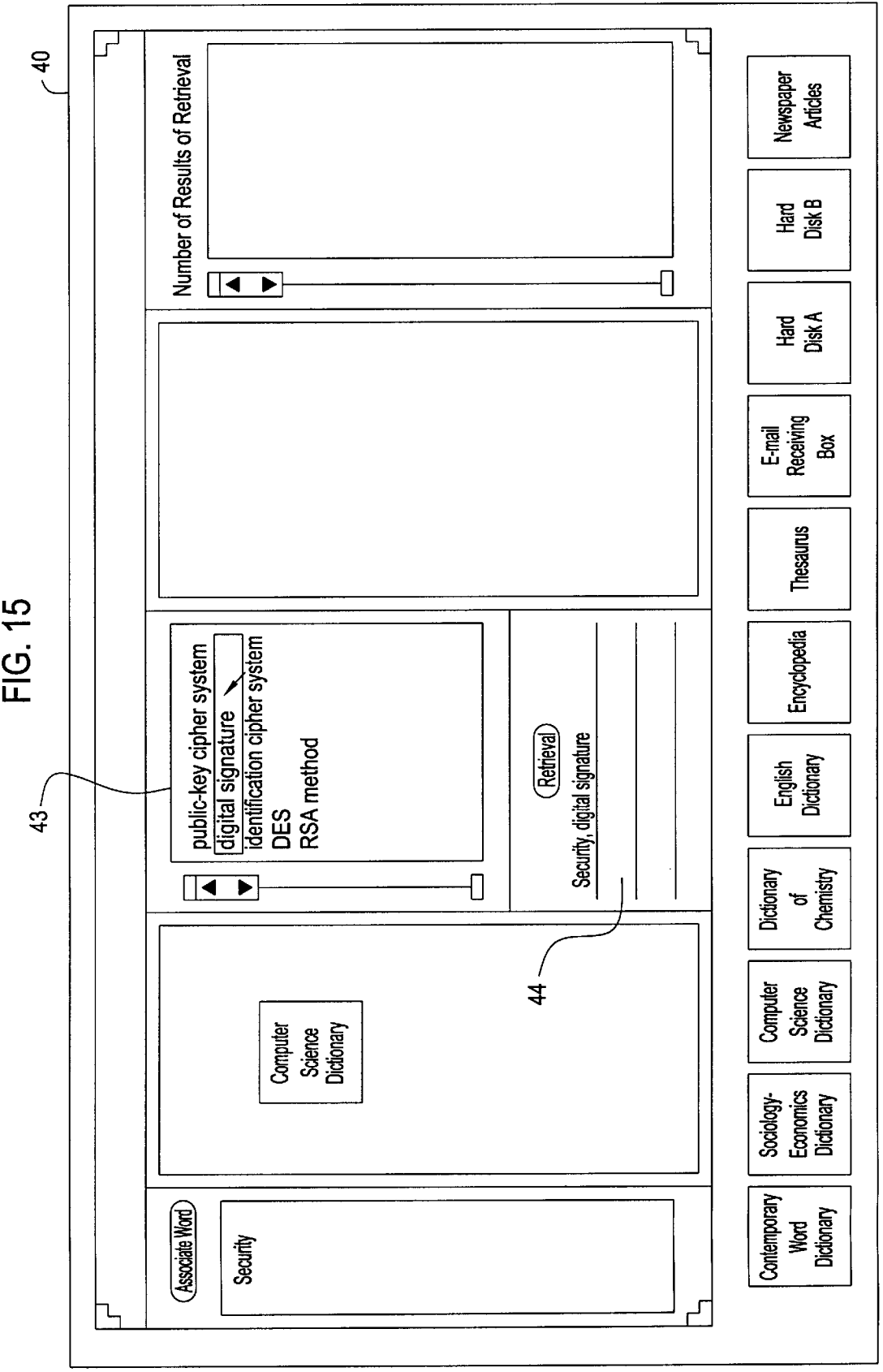
FIG. 15 shows the fifth operation screen of the user interface of the first embodiment.
Figure 16:
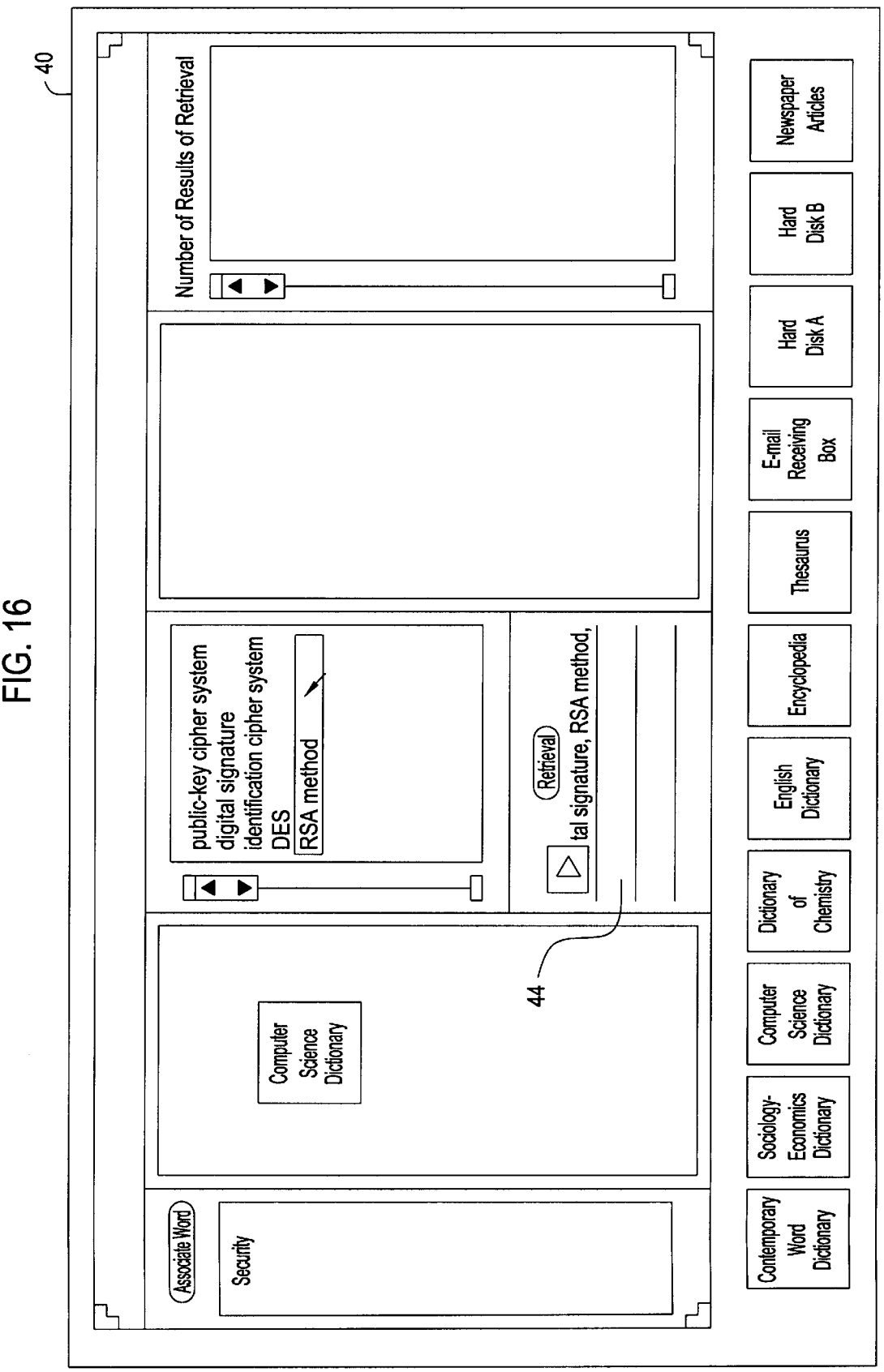
FIG. 16 shows the sixth operation screen of the user interface of the first embodiment.

The user selects an associate word determined to have high degree of association from those displayed on the screen. FIG. 15 shows the fifth operation screen of the user interface of the first embodiment. In the example, "digital signature" is selected. As the word determined to have high degree of association is selected, it is added to the document retrieval conditions in the subwindow 44. FIG. 16 shows the sixth operation screen of the user interface of the first embodiment. In the figure, "RSA method" is added to the document retrieval condition as the associate word determined to have high degree of association and selected from those displayed on the screen as same as shown in FIG. 15.

Figure 17:
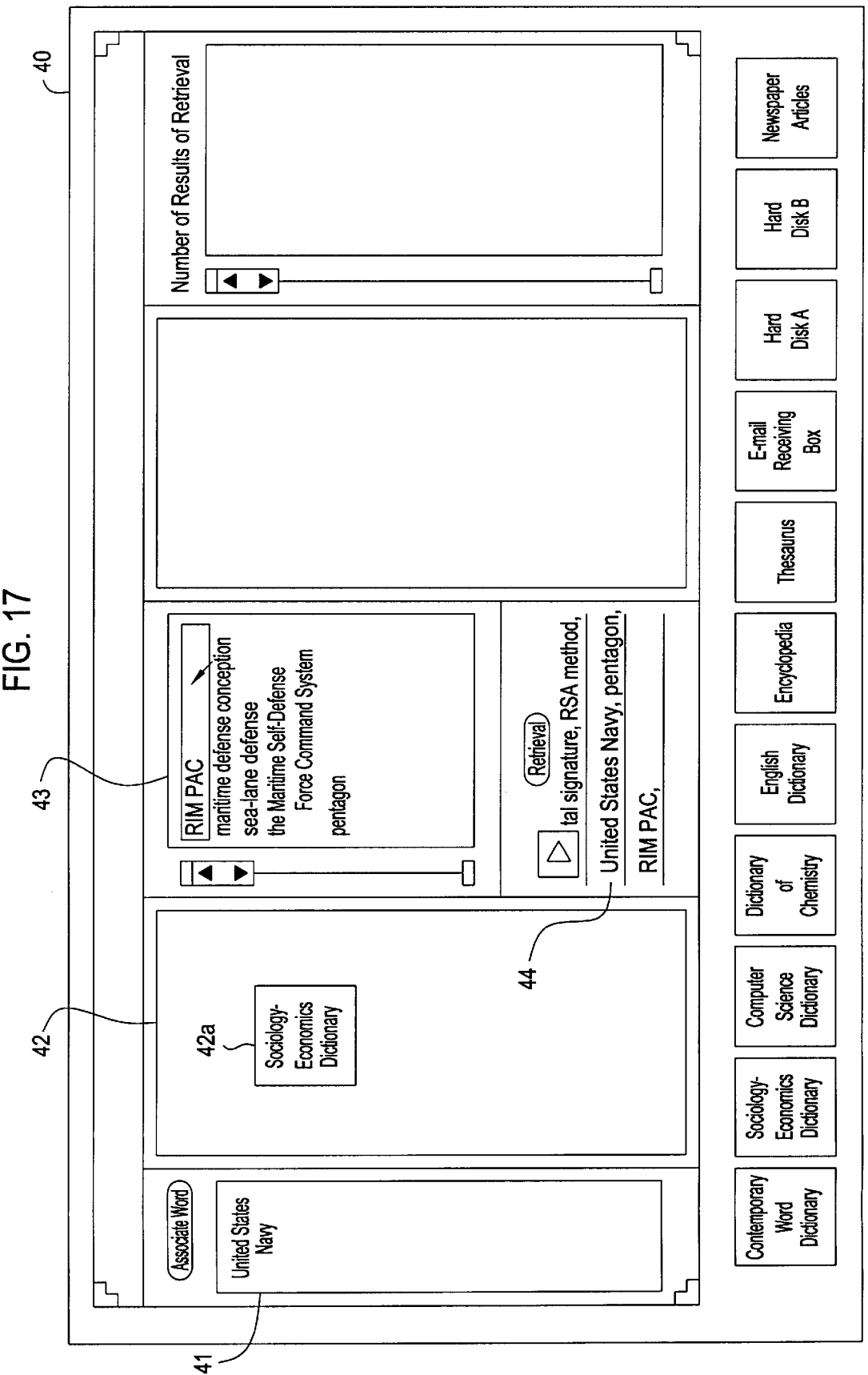
FIG. 17 shows the seventh operation screen of the user interface of the first embodiment.

Next, similar to the processes in FIGS. 8 through 13, the associate words of "United States Navy" are obtained from the sociology-economics dictionary, and the words determined to have high degree of association (here, "pentagon" and "RIMPAC") among those obtained are added to the document retrieval condition. FIG. 17 shows the seventh operation screen of the user interface of the first embodiment. In the example, the word "United States Navy" is inputted to the subwindow 41. In the subwindow 42, the "sociology-economics dictionary" icon 42b is placed. In the subwindow 43, the words extracted by calculating associate words of "United States Navy" based on the "sociology-economics dictionary" are displayed. In the subwindow 44, the words "United States Navy", "pentagon" and "RIMPAC" are added to the line below the words inputted in the screen shown in FIG. 16.

Figure 18:
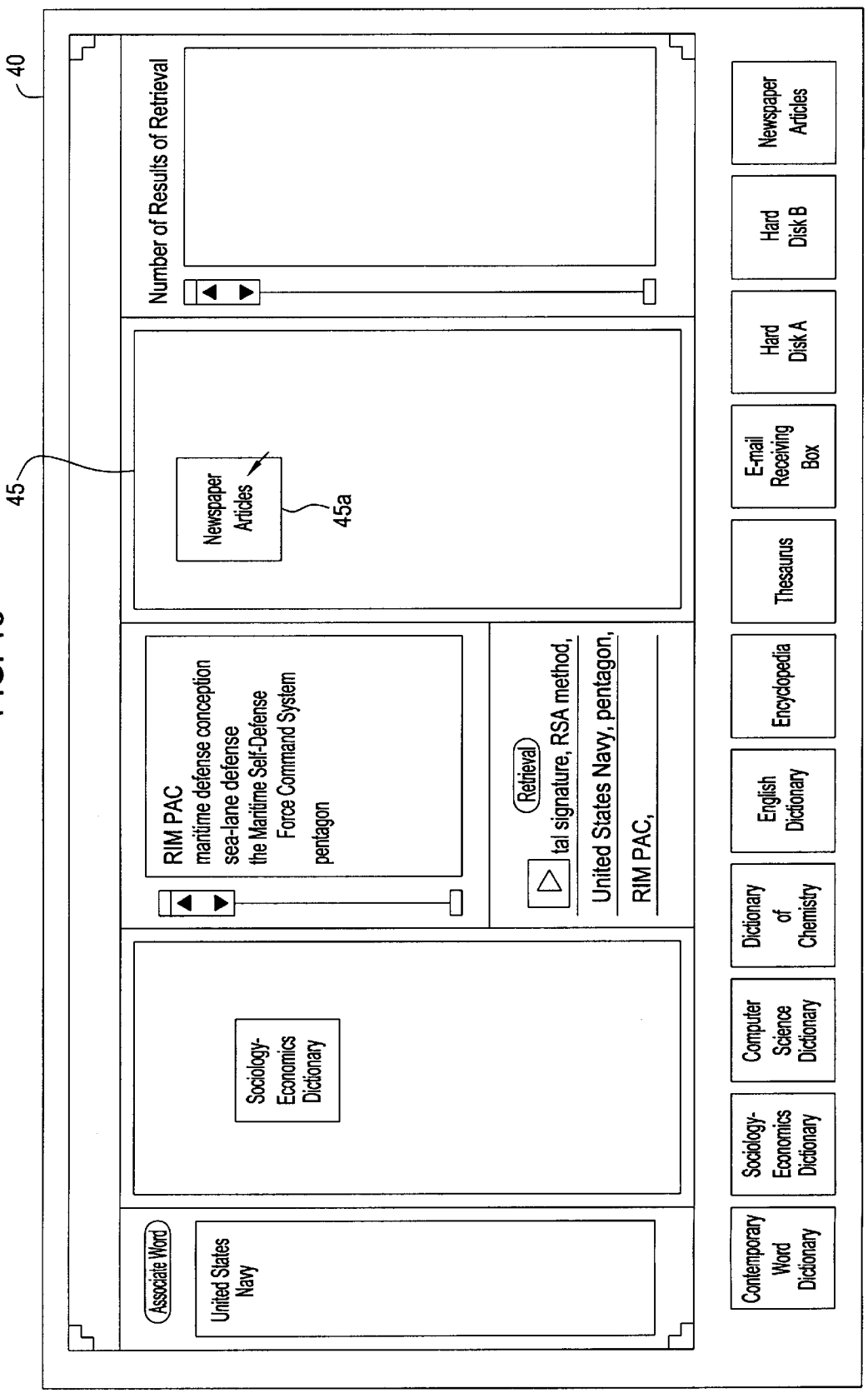
FIG. 18 shows the eighth operation screen of the user interface of the first embodiment.

Next, the document to be the object of retrieval is selected. FIG. 18 shows the eighth operation screen of the user interface of the first embodiment. In the screen, "newspaper articles" is selected as the retrieval object document, and "newspaper articles" icon 45a is placed in the subwindow 45. Thereby "retrieval condition for obtaining sets of documents to which the bibliographic items indicating that the sets of documents are items included in the newspaper articles are assigned" are inputted through the document retrieval condition inputting element 24.

Figure 19:
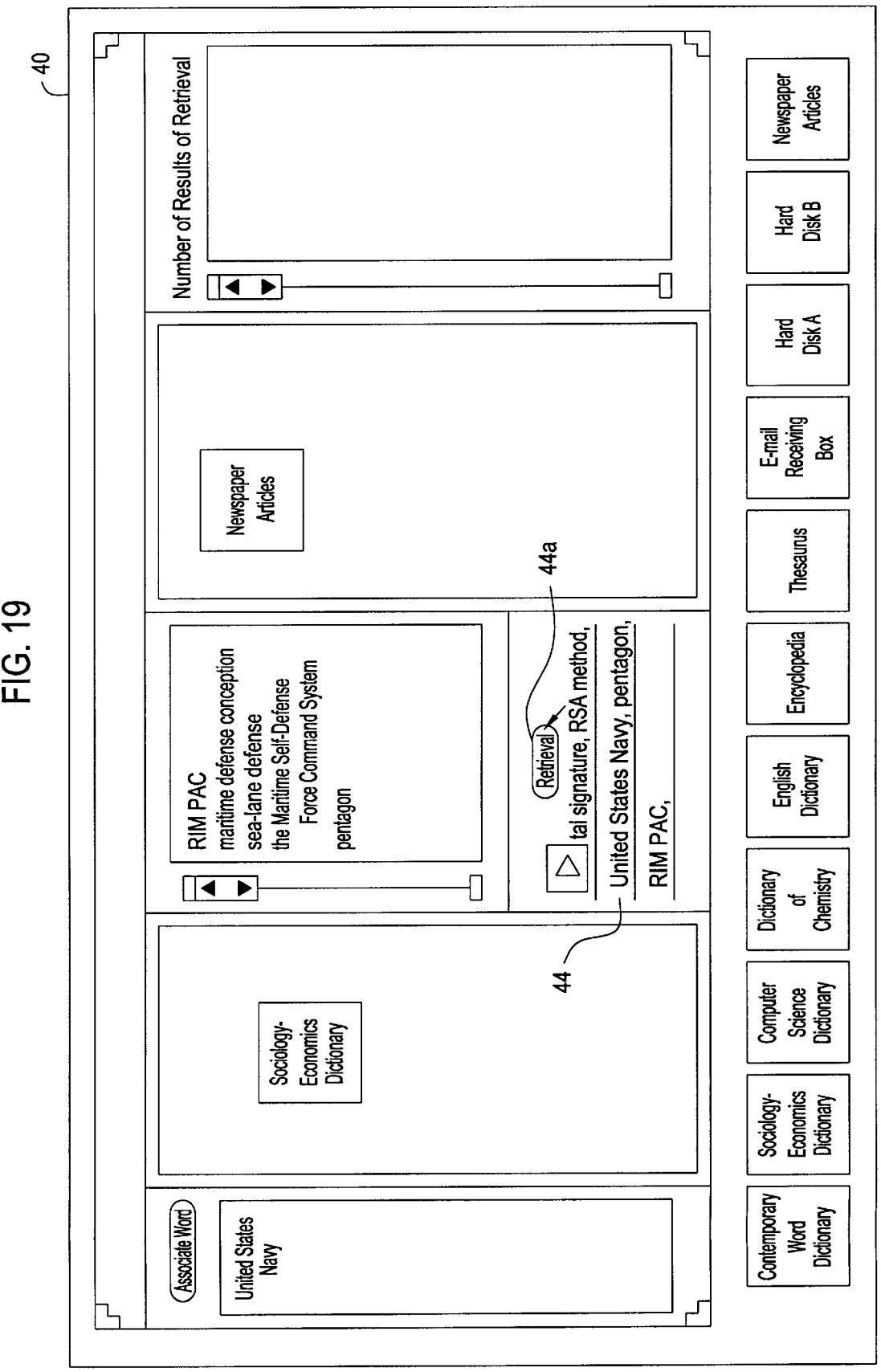
FIG. 19 shows the ninth operation screen of the user interface of the first embodiment.

The "retrieval" button is pressed in this state. FIG. 19 shows the ninth operation screen of the user interface of the first embodiment. By pressing the "retrieval" button 44a, the retrieval conditions in the subwindow 44 are interpreted as "(security OR digital signature OR RSA method) AND (United States Navy OR pentagon OR RIMPAC)" and the retrieval of the relevant articles from the newspaper articles already designated is executed.

Figure 20:
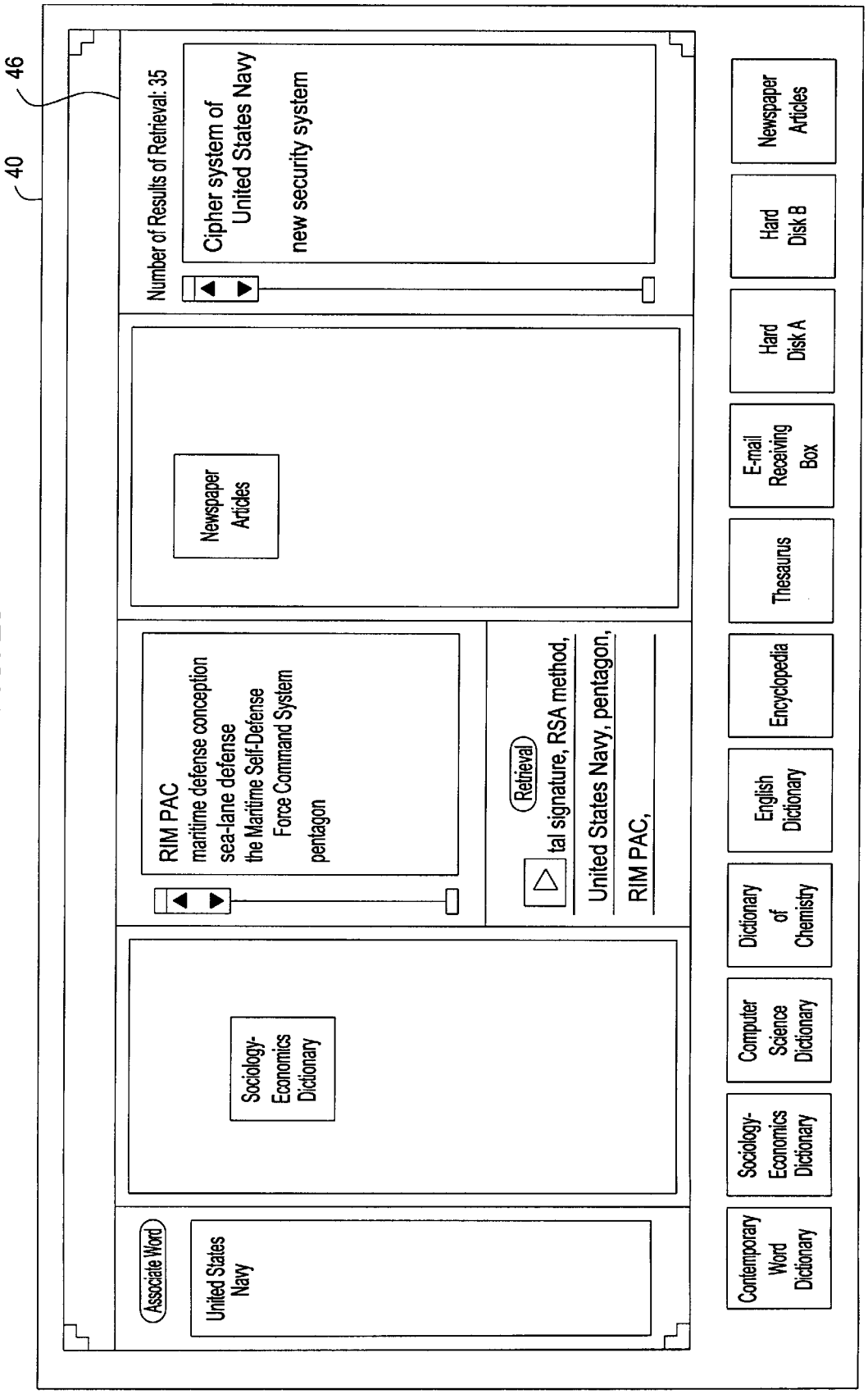
FIG. 20 shows the tenth operation screen of the user interface of the first embodiment.

FIG. 20 shows the tenth operation screen of the user interface of the first embodiment. As the retrieval is executed in the state shown in FIG. 19, the result of retrieval is displayed in the subwindow 46.

As it can be seen from the example, it is possible to freely designate the set of the documents to be used for associate word retrieval according to this embodiment. Therefore, the associate words closer to the purpose of the user can be presented compared with the conventional arts.

In the present embodiment, F (Wn) and N are obtained from the entire sets of documents as described in step 21 in FIG. 9 for the purpose of reducing the mutual information corresponding to the words frequently appearing in the entire sets of documents. However, if the number of the elements of the set of documents D matching the retrieval condition inputted through the retrieval condition inputting element 21 is sufficiently large, the purpose can be attained by obtaining F (Wn) and N within the range of the set of document D.

In the user interface of the present embodiment, the retrieval conditions inputted through the retrieval condition inputting element 21 for designating the set of documents to calculate the associate words are given in the form of icons on the basis of the bibliographic items. However, the inputting method can be easily replaced with a more general inputting method using keywords or the like.

Second Embodiment

Figure 21:
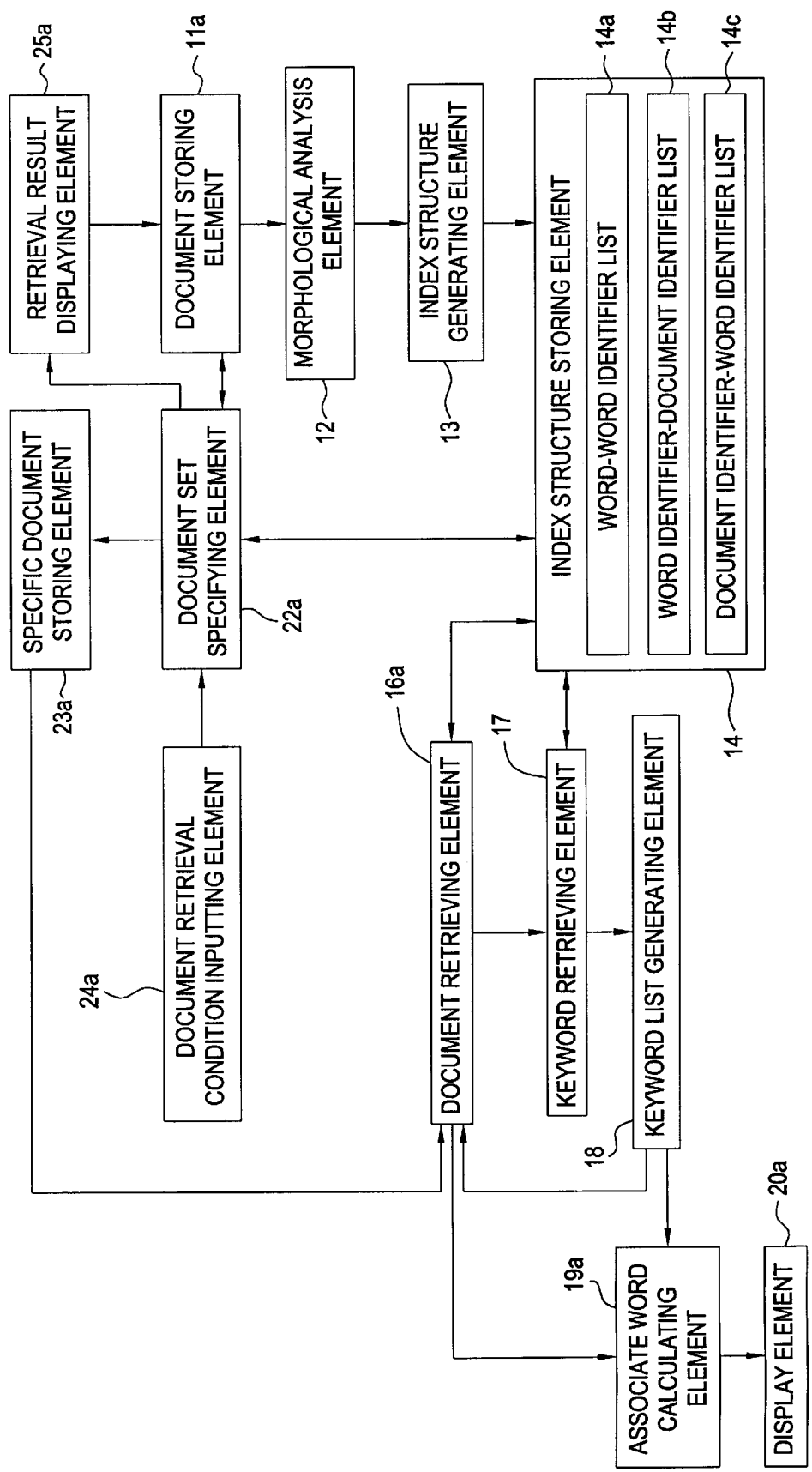
FIG. 21 shows a construction of the second embodiment of the present invention.

FIG. 21 shows the construction of the second embodiment of the present invention. The construction of the second embodiment is the same with that of the first embodiment except that the keyword inputting element and the retrieval condition inputting element are not included in the second embodiment. Here, only the elements having functions different from those of the first embodiment are explained, and the elements having the same functions with those of the first embodiment have the same reference numbers (and alphabets) and the explanations are omitted.

The document storing element 11a is a storing device which pairs the content of each of electronic documents to be the object of the retrieval with each document identifier assigned by the morphological analysis element 12 and stores them.

The document retrieving element 16a is a program module which receives the keyword and obtains the document identifiers of all documents including the keyword with reference to the word-word identifier list 14*a* and the word identifier-document identifier list 14*b*. If the received keyword is included in the keyword list generated by the keyword list generating element 18, only the total number of the document identifiers is obtained, and if the received keyword is included in the retrieval condition inputted through the document retrieval condition inputting element 24*a*, the set of document identifiers corresponding to the document identifiers stored in the specific document storing element 23*a* among the obtained document identifiers are acquired as well as the total number of document identifiers.

The associate word calculating element 19*a* is a program module for calculating the mutual information between each of the keywords in the retrieval condition inputted through the document retrieval condition inputting element 24*a* and the word corresponding to each of the word identifiers related to the respective keywords in the list generated by the keyword list generating element 18 based on the list and the total number of document identifiers obtained by the document retrieving element 16*a*.

The displaying element 20*a* is a program module having the user interface which receives the values of mutual information calculated by the associate word calculating element 19*a* and outputs the words in descending order of values of mutual information between each of the words and each keyword in the retrieval condition inputted through the document retrieval condition inputting element 24*a*.

The document set designating element 22*a* is a program module which obtains the set of document identifiers matching the retrieval condition inputted through the document retrieval condition inputting element 24*a* with reference to the document storing element 11*a*, word-word identifier list 14*a* and the word identifier-document identifier list 14*b*.

The specific document storing element 23*a* is a storing device for storing the set of document identifiers obtained by the document set designating element 22*a* based on the retrieval condition inputted through the document retrieval condition inputting element 24*a*.

The document retrieval condition inputting element 24*a* is a program module having a user interface capable of inputting the retrieval condition used for execution of document retrieval by the user in a form of logical expression which connects the keywords by OR or AND.

The retrieval result displaying element 25*a* is a program module having a user interface capable of displaying the document information corresponding to the set of document identifiers obtained by the document set designating element 22*a* based on the retrieval condition inputted through the document retrieval condition inputting element 24*a*.

In the present embodiment, the set of documents designated by the document set designating element 22*a* based on the retrieval condition inputted through the document retrieval condition inputting element 24*a* in a form of the logical expression created by connecting the keywords by OR or AND is used as the set of documents for obtaining the associate words.

In the first embodiment, the associate words of the initial keyword are obtained by assuming the keyword inputted through the keyword inputting element 15 as the initial keyword, but in the present embodiment, the processes shown in FIGS. 8 and 9 are executed on every keyword included in the retrieval condition inputted through the document retrieval condition inputting element 24*a* for obtaining the mutual information. Furthermore, the retrieval result displaying element 25*a* displays the pairs of keyword and associate word in the descending order of values of all obtained mutual information.

FIGS. 22 through 28 illustrate the user interface of the second embodiment.

Figure 22:
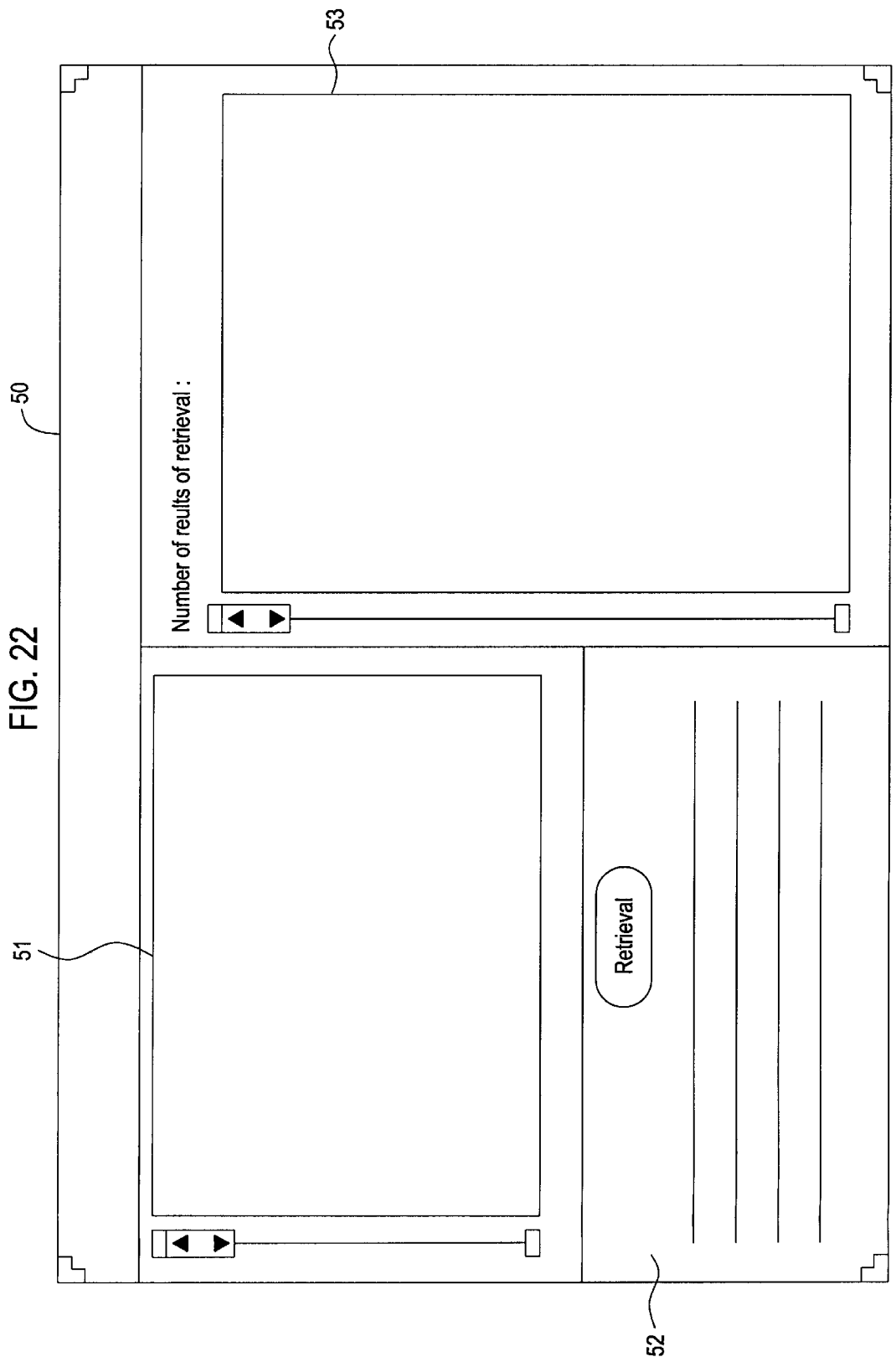
FIG. 22 shows an initial screen of a user interface of the second embodiment.

FIG. 22 shows an initial screen 50 of the user interface of the second embodiment. In the figure, plural subwindows 51 through 53 are displayed in a main window 50. The subwindows 51, 52 and 53 correspond to the displaying element 20*a*, document retrieval condition inputting element 24*a* and retrieval result displaying element 25*a*, respectively.

FIGS. 23 through 28 show an example of operation in the case where the purpose of retrieval is "to retrieve the documents as to what type of building is resistant to earthquakes written based on the specific examples of earthquakes".

Figure 23:
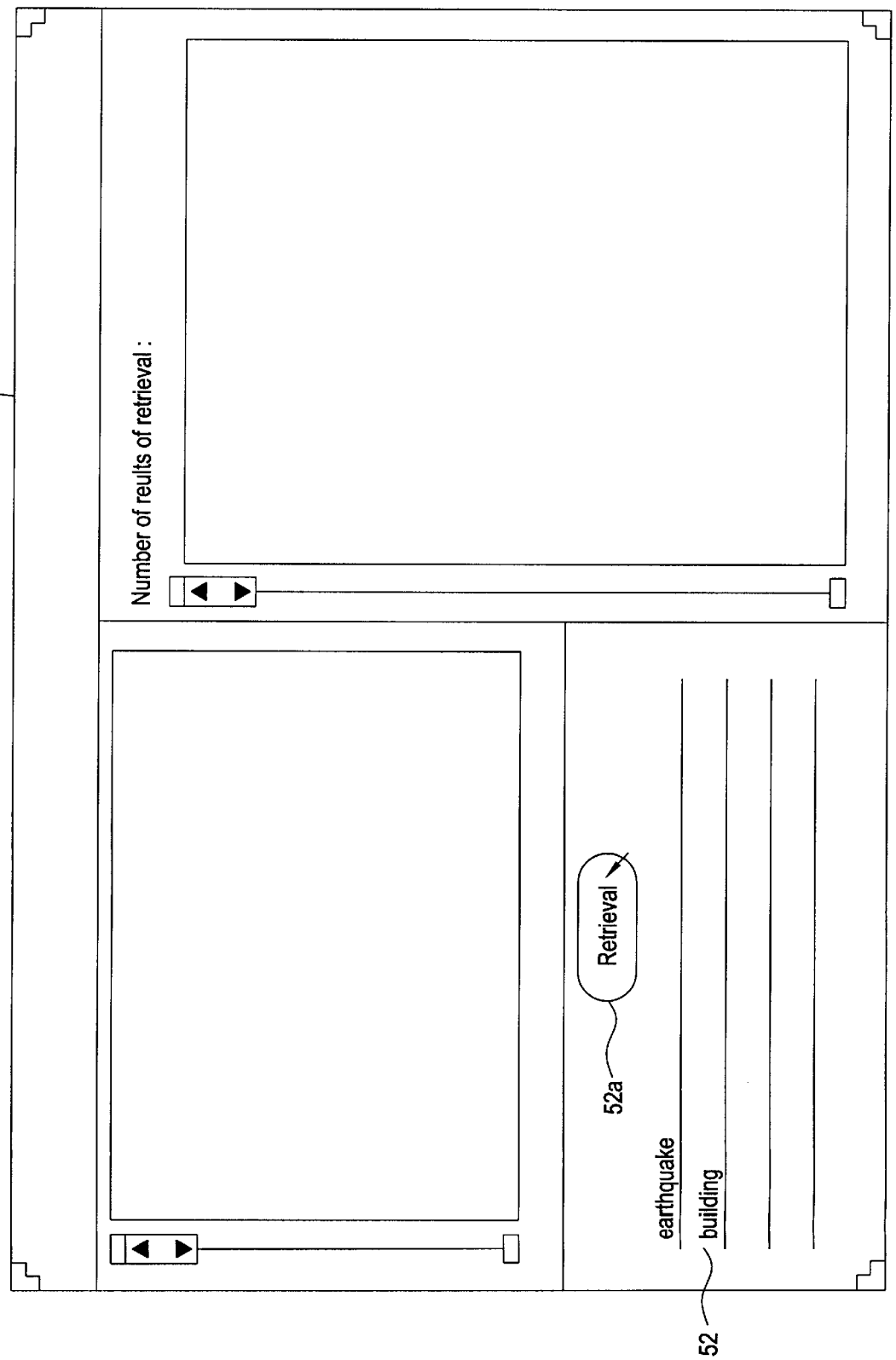
FIG. 23 shows the first operation screen of the user interface of the second embodiment.

At first, the retrieval condition is inputted. FIG. 23 shows the first operation screen of the user interface of the second embodiment. In the screen, the retrieval condition is set as "earthquake AND building" and the "retrieval" button 52*a* is pressed.

Figure 24:
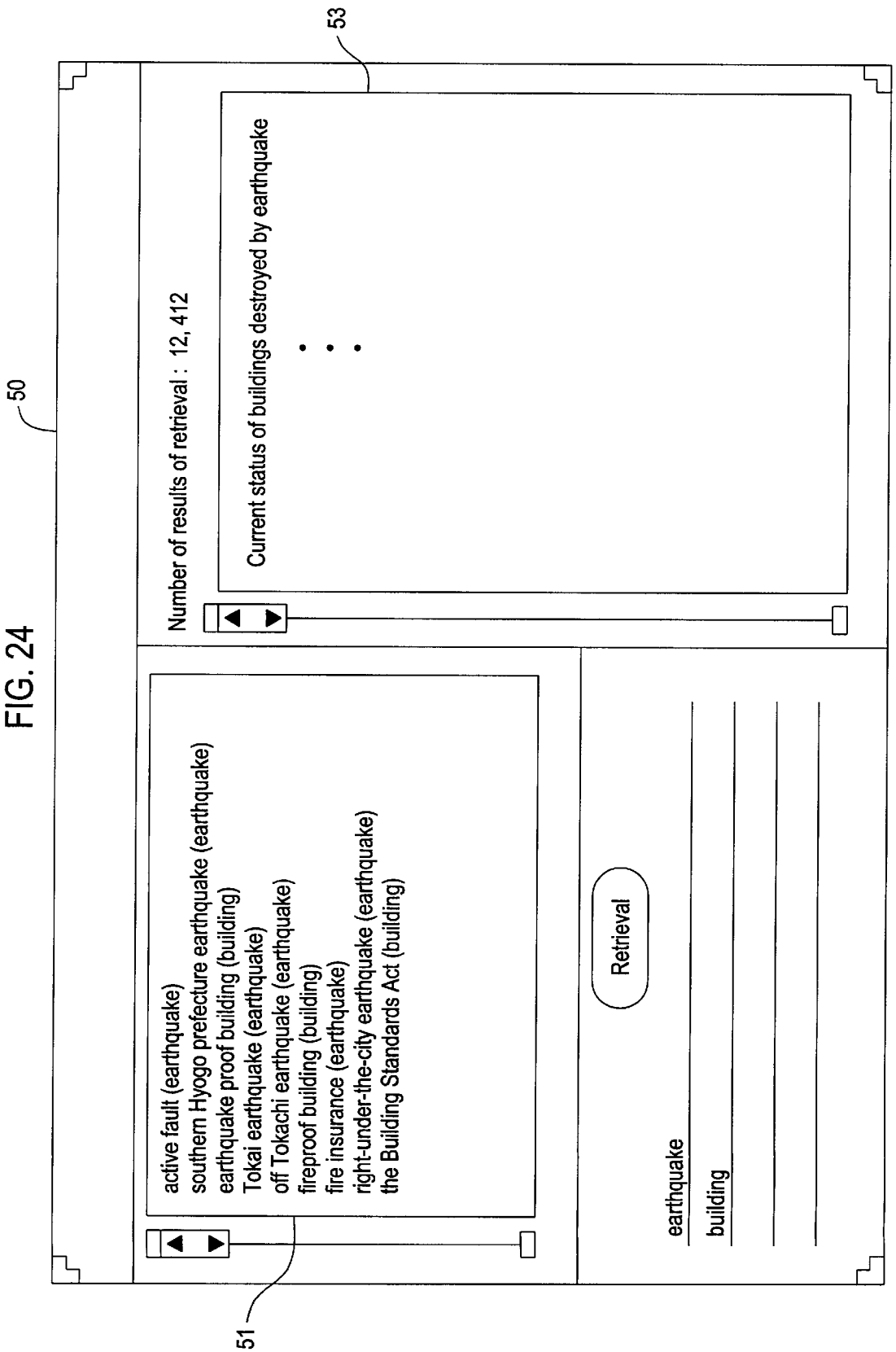
FIG. 24 shows the second operation screen of the user interface of the second embodiment.

The retrieval is started by pressing the "retrieval" button 52*a*. FIG. 24 shows the second operation screen of the user interface of the second embodiment. The retrieval is executed and the result is displayed in the subwindow 53. At the same time, the processes shown in FIGS. 8 and 9 are executed on each of "earthquake" and "building" based on the set of documents obtained as the result of retrieval, and thereby the mutual information is calculated. In the subwindow 51, the associate words are displayed in descending order of the values of the mutual information. The parenthesized words in the subwindow 51 are initial keywords used for calculating the mutual information.

Figure 25:
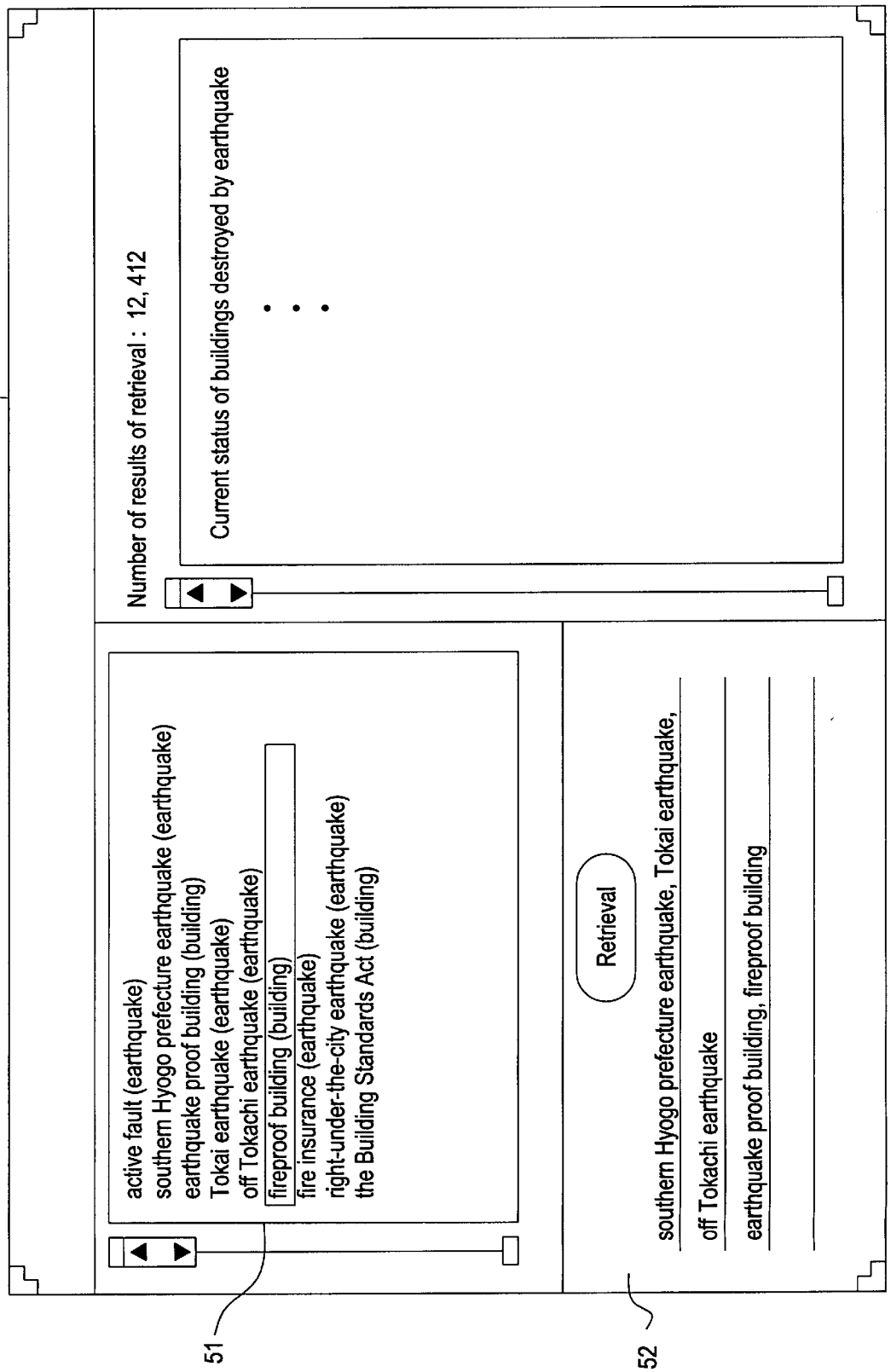
FIG. 25 shows the third operation screen of the user interface of the second embodiment.

The user selects the retrieval condition which seems to be appropriate with reference to the display of the associate words in the screen shown in FIG. 24. FIG. 25 shows the third operation screen of the second embodiment. The user further selects a retrieval condition which seems to be appropriate and inputs it in the subwindow 53. In FIG. 25, "(southern Hyogo prefecture earthquake OR Tokai earthquake OR off Tokachi earthquake) AND (earthquake-proof building OR fireproof building)" is determined to be a new retrieval condition.

Figure 26:
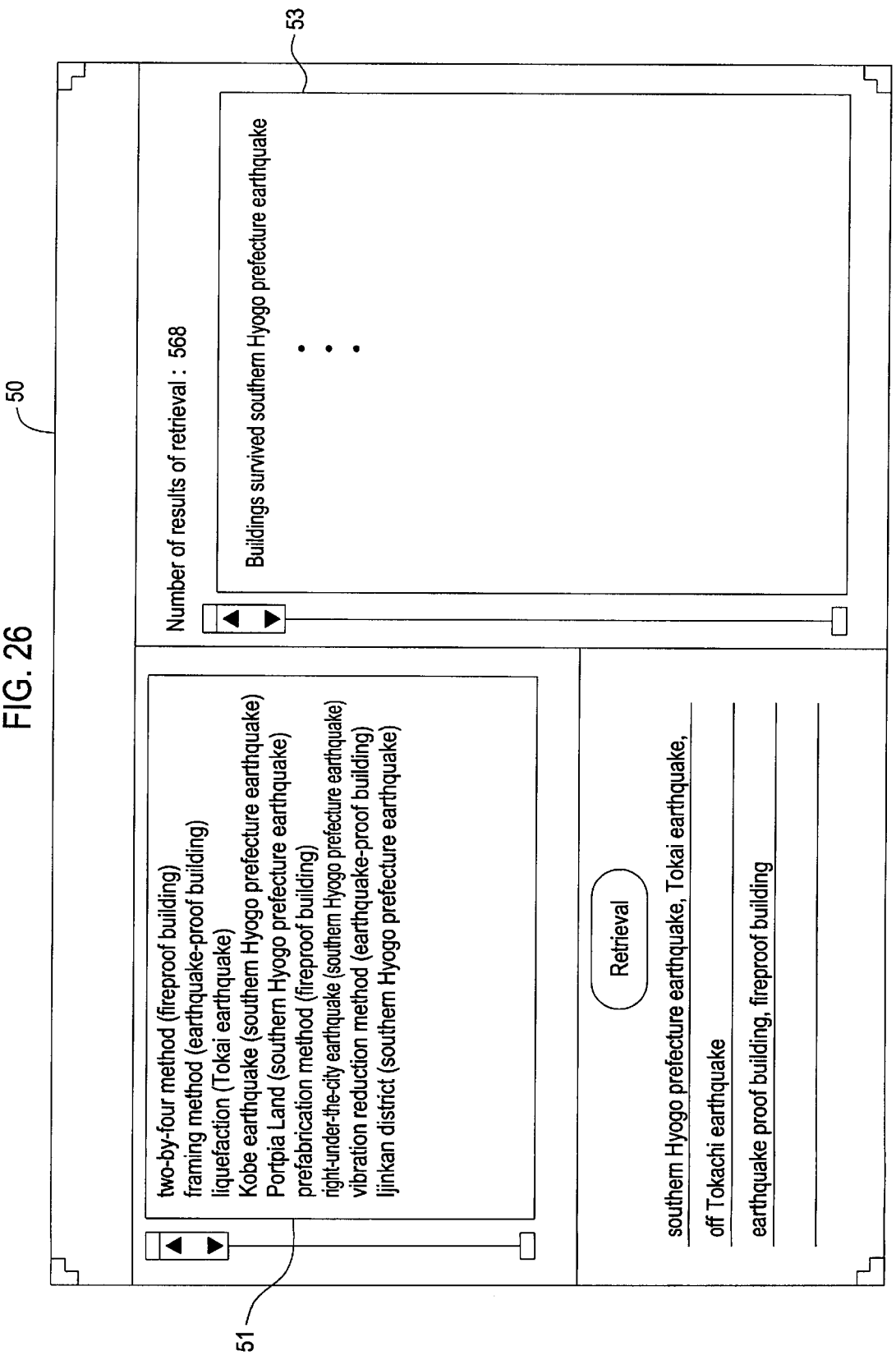
FIG. 26 shows the fourth operation screen of the user interface of the second embodiment.

The retrieval is executed again according to the retrieval condition shown in FIG. 25. FIG. 26 shows the fourth operation screen of the user interface of the second embodiment. As the retrieval is executed again, the set of documents obtained according to the new retrieval condition is displayed in the subwindow 53, and in addition, the associate words calculated based on the set of documents are displayed in the subwindow 51, which is similar to FIG. 24.

Figure 27:
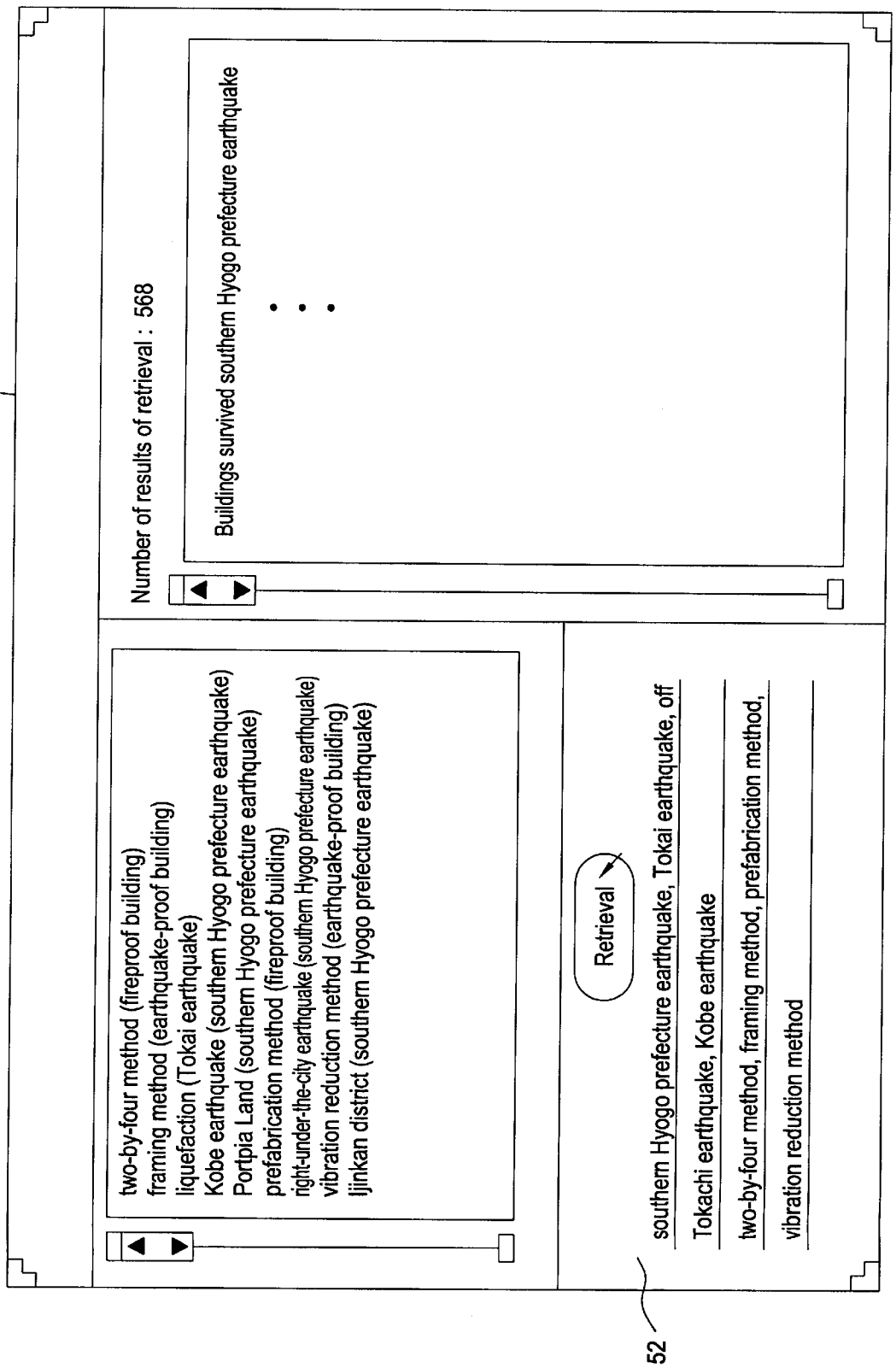
FIG. 27 shows the fifth operation screen of the user interface of the second embodiment.

More retrieval conditions which seem to be appropriate are inputted and the retrieval is executed. FIG. 27 shows the fifth operation screen of the user interface of the second embodiment. In the screen, "(southern Hyogo prefecture earthquake OR Tokai earthquake OR off Tokachi earthquake OR Kobe earthquake) AND (two-by-four method OR framing method OR prefabrication method OR vibration-reduction method)" is inputted to the subwindow 52 as a new retrieval condition.

Figure 28:
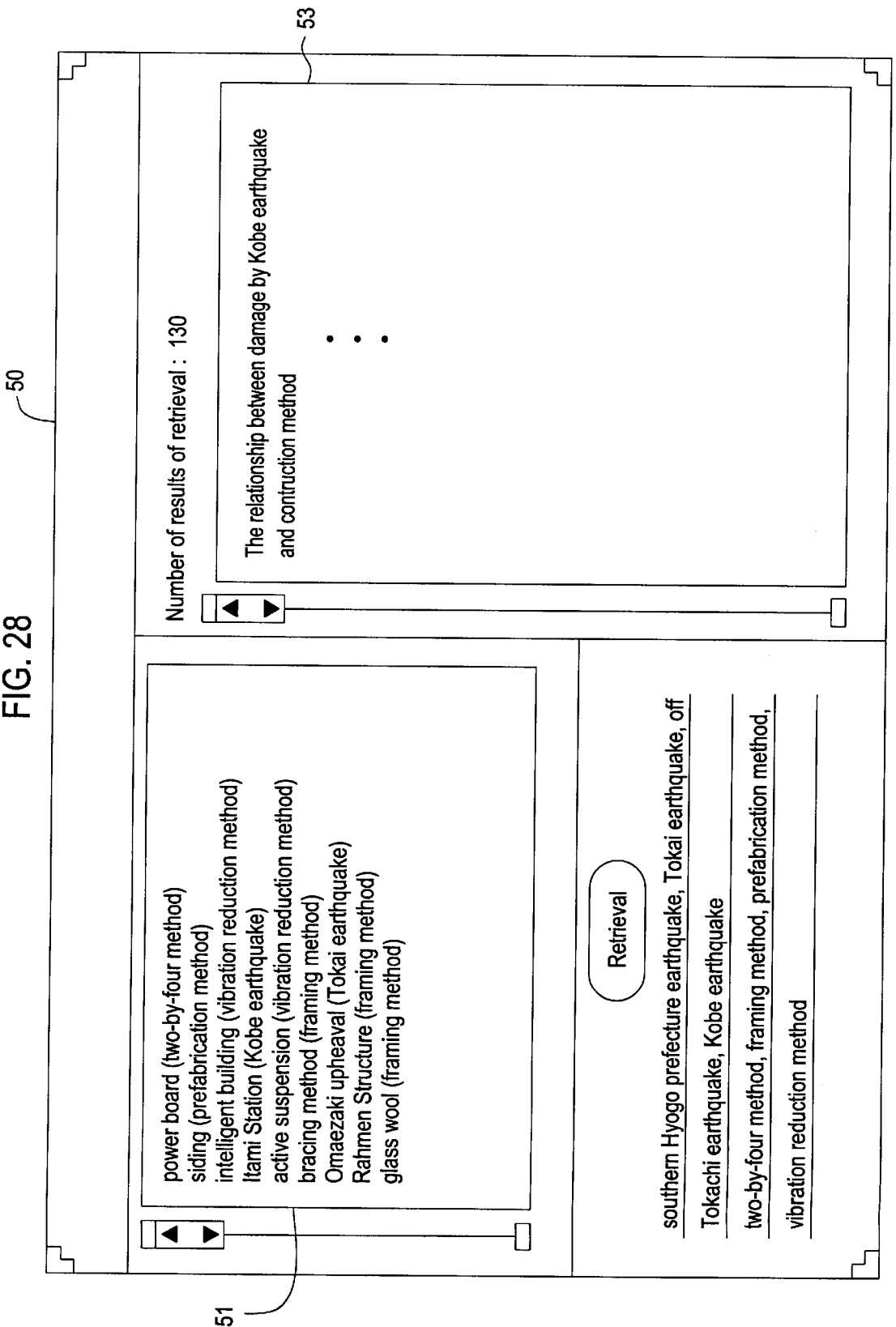
FIG. 28 shows the sixth operation screen of the user interface of the second embodiment.

Then the set of documents and associate words matching the retrieval condition shown in FIG. 27 are obtained. FIG. 28 shows the sixth operation screen of the user interface of the second embodiment. By executing the retrieval based on the retrieval condition shown in FIG. 27, the associate words different from those shown in FIG. 26 are displayed in the subwindow 51 and the result of retrieval different from that shown in FIG. 26 is displayed in the subwindow 53 concurrently.

As described above, according to the second embodiment, it becomes possible to constantly present the appropriate associate words by integrating the associate word presentation system and the retrieval system for dealing with them as a single system even in the case where the sets of the documents are narrowed down as the retrieving process proceeds. Thereby narrowing down the sets of documents can be effectively performed.

In the second embodiment, the keywords are connected by OR or AND to form a logical expression and inputted through the document retrieval condition inputting element 24a. Even if the retrieval condition including the bibliographic items is used together with the above retrieval condition, it is obvious that the effect as same as that obtained in the present embodiment is available.

The mutual information (or Dice-coefficient or t-score) is a statistical value which makes an absolute comparison between arbitrary two values possible. For example, MI (active fault, earthquake) and MI (building, fire insurance) can be compared with each other and a word pair having a larger value of MI is determined to have the higher degree of association. Consequently, it can be said that the user interface of the subwindow 51 of the present embodiment which arranges the words corresponding to respective keywords in descending order of values of their mutual information is an appropriate means of display for presenting the associate words.

Effects produced by the embodiments of the present invention described above are explained below.

Figure 30:
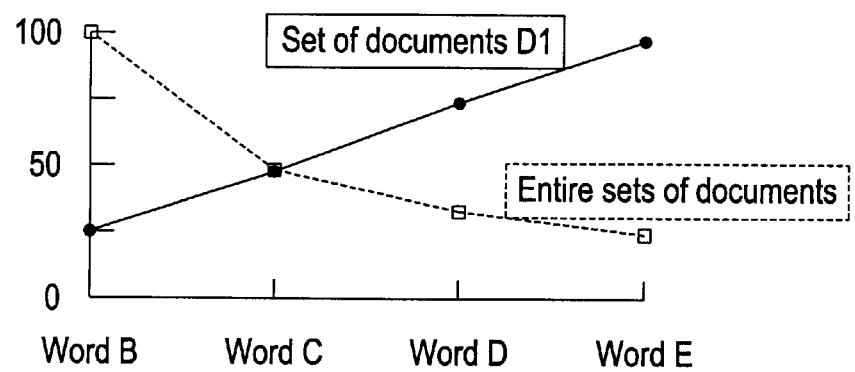
FIG. 30 shows a result of simulation to confirm an effect of the present invention.

FIGS. 29 and 30 show an example of data used for verifying the effects of the present invention and the result of simulation, respectively.

In FIG. 29, the set of 200,000 documents which can be divided (narrowed down) into two sets of documents, D1 and D2, based on the retrieval utilizing the bibliographic items or the keywords is assumed. The document IDs which are integral numbers from 0 to 199,999 are assigned to the respective documents. It is further assumed that the set of documents D1 consists of 100,000 documents as the elements having document IDs from 0 to 99,999 and the set of documents D2 consists of 100,000 documents as the elements having the document IDs from 100,000 to 199,999. FIG. 29 shows the range of existence of five keywords (word A through word E) in the sets of documents and their appearance probabilities. For example, word A exists in the range of the documents having the document IDs from 0 to 50,000 and in the range of the documents having the document IDs from 100,000 to 150,000, and the appearance probability (distribution probability) in each range is 0.5.

FIG. 30 shows the result of the simulation for verifying the effect of the present invention. This is the results of calculation of mutual information of each of word B through word E as to word A using each of the entire sets of documents and the set of documents D1. In the case of the entire sets of documents, the arrangement of keywords in descending order of values of mutual information as to word A is: word B, word C, word D and word E. in the set of documents D1, the arrangement is: word E, word D, word C and word B. That is, word E is determined to have lower degree of association than other keywords in the case where the associate word calculation is executed by using the entire sets of documents, but it becomes possible to present word E as a keyword having the highest degree of association with the user's purpose of retrieval by calculating the associate word by using the set of documents D1 obtained by narrowing down the documents. In contrast, word B is determined to have the highest degree of association in the case of calculation of associate word using the entire sets of documents, but it can be determined to be the keyword inappropriate to be presented from the viewpoint of the user's purpose of retrieval by calculating the associate word by using the set of documents obtained by narrowing down the documents.

FIG. 31 shows an example of calculation according to the present invention using real data. This is the result of calculation of the associate words of the initial keyword "religion" using a set of items including the word "Israel" and a set of items including the word "India" as the sets of documents for associate word calculation. It can be found from the example that the results of calculation reflect the contents of sets of documents.

As described above, the present invention is able to realize the presentation of the appropriate associate words suitable to the process of narrowing down the documents by integrating the associate word presentation system and the retrieval system and dealing with them as a single system, which has been impossible for the conventional arts.

Moreover, it becomes possible to determine the set of documents used for associate word calculation at will by separating the retrieval condition for designating the set of documents used for associate word calculation from the retrieval condition used for narrowing down the documents in the process of retrieval, and thereby more flexible associate word presentation is available.

In the above embodiments, documents are the object of retrieval, but the object is not limited thereto. Anything that includes words can be the object of retrieval as long as items each of which is a group of words are divided so that a computer can distinguish them, such as items in an encyclopedia or elements in a structured document. For example, it is possible for a computer to differentiate the contents of information if dividing marks or the like are inserted between a group of words and others.

The above-described embodiments can be implemented by a computer program. In such a case, the program and the documents to be the object of retrieval by the program can be stored in a computer-readable storage medium.

Here, the "storage medium" means a medium capable of causing the change of state of energy such as magnetism, light, electricity or the like in accordance with the contents of description of a program and transmitting the contents of description of the program to a reading device disposed to hardware resources of a computer in a form of a signal corresponding to the change of the state of energy. The storage medium is, for example, a magnetic disk, optical disk, CD-ROM, built-in-memory of a computer, or the like.

The functions of the above-described embodiments can be provided to users through the broad information communication network, typified by the Internet. In this case, it is necessary for the terminal of the user to be equipped with the function as the user interface. If the document processing function of the present invention is to be provided through the Internet or intranet, the information about the associate words or the like may be transferred to the user's terminal in a form readable by utilizing the viewing software generally distributed.

As aforementioned, the document processing apparatus according to the present invention retrieves the documents in accordance with the retrieval condition given by the user and extracts the associate words on the basis of the retrieved documents as a criterion of determination; therefore the retrieval condition for searching the associate words can be determined independently of narrowing down the documents in the process of document retrieval. As a result, it becomes possible for the user to determine the set of documents used for associate word calculation at will, and thereby the associate words can be presented with more flexibility.

The word extracting apparatus according to the present invention retrieves items including the words matching the retrieval condition given by the user and extracts the associate words on the basis of the retrieved items as a criterion of determination; therefore the retrieval condition for searching the associate words can be determined independently of narrowing down the items in the process of document retrieval. As a result, it becomes possible for the user to determine the set of items used for associate word calculation at will, and thereby the associate words can be presented with more flexibility.

The word extracting method according to the present invention retrieves items including the words matching the retrieval condition given by the user and extracts the associate words on the basis of the retrieved items as the criterion of determination; therefore the retrieval condition for searching the associate words can be arbitrarily determined. As a result, it becomes possible for the user to determine the set of items used for associate word calculation at will, and thereby the associate words can be presented with more flexibility.

The storage medium for storing the word extracting program according to the present invention stores the program to have the computer retrieve the documents in accordance with the retrieval condition provided by the user and extract the associate words on the basis of the retrieved documents as the criterion of determination; therefore it becomes possible for the user to determine the set of items used for associate word calculation by making the computer execute the program, and thereby the computer system capable of presenting the associate words with more flexibility can be constructed.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document processing apparatus comprising:
    a document information storing element for storing information including a document identifier and a plurality of words included in a document for each of all documents;
    a retrieval condition inputting element for inputting a retrieval condition for the documents to be retrieved;
    a retrieving element for retrieving specific documents matching the retrieval condition by using the information;
    a keyword designating element for designating an arbitrary word in the documents as an associate-word-searching word and designating other words as candidates to be associated;
    a simultaneous appearance probability calculating element for calculating a probability that the associate-word-searching word and one of the candidates are simultaneously included in any of the documents retrieved by the retrieving element for each of the candidates;
    a first independent appearance probability calculating element for calculating a first probability that the associate-word-searching word is included in any of all documents;
    a second independent appearance probability calculating element for calculating a second probability that one of the candidates is included in any of all documents for each of the candidates;
    a calculating element for calculating the sum of product of the first and second probabilities for each of the candidates; and
    an associate word extracting element for calculating a ratio of the probability calculated by the simultaneous appearance probability calculating element to the sum or product calculated by the calculating element for each of the candidates and extracting a word according to the ratio of each of the candidates.

2. A word extracting apparatus comprising:
    an item information storing element for storing information including an item identifier and a plurality of words included in an item for each of all items;
    a retrieval condition inputting element for inputting a retrieval condition for the items to be retrieved;
    a retrieving element for retrieving specific items matching the retrieval condition by using the information;
    a keyword designating element for designating an arbitrary word in the items as an associate-word-searching word and designating other words as candidates to be associated;
    a simultaneous appearance probability calculating element for calculating a probability that the associate-word-searching word and one of the candidates are simultaneously included in any of the items retrieved by the retrieving element for each of the candidates;
    a first independent appearance probability calculating element for calculating a first probability that the associate-word-searching word is included in any of all items;
    a second independent appearance probability calculating element for calculating a second probability that one of the candidates is included in any of all items for each of the candidates;
    a calculating element for calculating the sum or product of the first and second probabilities for each of the candidates; and
    an associate word extracting element for calculating a ratio of the probability calculated by the simultaneous appearance probability calculating element to the sum or product calculated by the calculating element for each of the candidates and extracting a word according to the ratio of each of the candidates.

3. A word extracting apparatus comprising:
    an item information storing element for storing information including an item identifier and a plurality of words included in an item for each of all items;
    a retrieval condition inputting element for inputting a retrieval condition for the items to be retrieved;
    a retrieving element for retrieving specific items matching the retrieval condition by using the information;
    a keyword designating element for designating an arbitrary word in the items as an associate-word-searching word and designating other words as candidates to be associated;
    a simultaneous appearance probability calculating element for calculating a probability that the associateword-searching word and one of the candidates are simultaneously included in any of the items retrieved by the retrieving element for each of the candidates;

a first independent appearance probability calculating element for calculating a first probability that the associate-word-searching word is included in any of all items;

a second independent appearance probability calculating element for calculating a second probability that one of the candidates is included in any of all items for each of the candidates;

a calculating element for calculating the sum or product of the first and second probabilities for each of the candidates; and an associate word extracting element for calculating a statistical value using the probability calculated by the simultaneous appearance probability calculating element and the sum or product calculated by the calculating element for each of the candidates and extracting a word according to the statistical values of each of the candidates.

4. The word extracting apparatus as set forth in claim 3, wherein the associate word extracting element adopts at least one of mutual information, Dice-coefficient and t-score as the statistical value and extracts the candidate having the statistical value not less than a predetermined threshold value.

5. The word extracting apparatus as set forth in claim 3, further comprising:

a displaying element for displaying the item retrieved by the retrieving element.

6. A word extracting method for an information retrieving apparatus which comprises an item information storing element for storing information including an item identifier and a plurality of words included in an item for each of all items, comprising the steps of:

inputting a retrieval condition for the item;

retrieving specific items matching the retrieval condition from the item information storing element;

designating an arbitrary word in the retrieved items as an associate-word-searching word and designating other words as candidates to be associated;

calculating a simultaneous probability that the associate-word-searching word and one of the candidates are simultaneously included in any of the retrieved items for each of the candidates;

calculating a first probability that the associate-word-searching word is included in any of all items;

calculating a second probability that one of the candidates is included in any of all items for each of the candidates;

calculating the sum or product of the first and second probabilities for each of the candidates; and calculating a statistical value using the simultaneous probability and the sum or product for each of the candidates and extracting a word according to the statistical value of each of the candidates.

7. A storage medium readable by a computer, storing a program of instructions executable by the computer to perform a method for extracting a word, the method comprising the steps of:

storing information including an item identifier and a plurality of words included in an item for each of all items;

inputting a retrieval condition for the items;

retrieving specific items matching the retrieval condition from the item information storing element;

designating an arbitrary word in the retrieved items as an associate-word-searching word and designating other words as candidates to be associated;

calculating a simultaneous probability that the associate-word-searching word and one of the candidates are simultaneously included in any of the retrieved items for each of the candidates;

calculating a first probability that the associate-word-searching word is included in any of all items;

calculating a second probability that one of the candidates is included in any of all items for each of the candidates;

calculating the sum or product of the first and second probabilities for each of the candidates; and calculating statistical value using the simultaneous probability and the sum or product for each of the candidates and extracting a word according to the statistical value of each of the candidates.

* * * * *